(12) United States Patent
Kato et al.

(10) Patent No.: US 8,583,742 B2
(45) Date of Patent: Nov. 12, 2013

(54) METHOD, APPARATUS, AND COMPUTER-READABLE RECORDING MEDIUM FOR DISPLAYING MAIL LIST OR LIST AND FOR MANAGING MAIL

(75) Inventors: Yoshitaka Kato, Nagano (JP); Akira Takada, Nagano (JP); Sayaka Kainuma, Nagano (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 11/808,119

(22) Filed: Jun. 6, 2007

(65) Prior Publication Data

US 2008/0021967 A1   Jan. 24, 2008

(30) Foreign Application Priority Data

Jun. 9, 2006 (JP) .................................. 2006-161022

(51) Int. Cl.
*G06F 15/16* (2006.01)
(52) U.S. Cl.
USPC ............ 709/206; 709/205; 709/207; 715/752
(58) Field of Classification Search
None
See application file for complete search history.

(56) References Cited

U.S. PATENT DOCUMENTS

| | | | | |
|---|---|---|---|---|
| 5,371,851 | A * | 12/1994 | Pieper et al. ................... | 345/501 |
| 6,289,212 | B1 * | 9/2001 | Stein et al. ................. | 455/412.1 |
| 7,313,764 | B1 * | 12/2007 | Brunner et al. ................ | 715/784 |
| 7,359,493 | B1 * | 4/2008 | Wang et al. ................. | 379/88.23 |
| 7,370,153 | B1 * | 5/2008 | Danilak ......................... | 711/137 |
| 7,401,298 | B1 * | 7/2008 | Sexton et al. .................. | 715/786 |
| 2001/0046886 | A1 * | 11/2001 | Ishigaki ......................... | 455/566 |
| 2002/0032739 | A1 * | 3/2002 | Iida ................................ | 709/206 |
| 2002/0065105 | A1 * | 5/2002 | Katada ........................... | 455/557 |
| 2003/0154256 | A1 * | 8/2003 | Hadano et al. ................ | 709/206 |
| 2003/0191750 | A1 * | 10/2003 | Espino .............................. | 707/3 |
| 2003/0224760 | A1 * | 12/2003 | Day ........................... | 455/412.1 |
| 2004/0221011 | A1 * | 11/2004 | Smith et al. .................... | 709/206 |
| 2005/0003870 | A1 * | 1/2005 | Nakano et al. ............. | 455/575.1 |
| 2005/0181768 | A1 * | 8/2005 | Roy ............................... | 455/413 |
| 2006/0206824 | A1 * | 9/2006 | Landschaft et al. .......... | 715/752 |
| 2007/0186182 | A1 * | 8/2007 | Schiller ......................... | 715/781 |
| 2007/0268200 | A1 * | 11/2007 | Fuller et al. .................... | 345/1.1 |

FOREIGN PATENT DOCUMENTS

| | | |
|---|---|---|
| JP | 2000-222301 | 8/2000 |
| JP | 2002-073490 | 3/2002 |
| JP | 2002-342247 | 11/2002 |
| JP | 2002-366342 | 12/2002 |
| JP | 2003-030116 | 1/2003 |

OTHER PUBLICATIONS

Japanese Office Action for corresponding Japanese Application 2007-246101; mailed Feb. 19, 2008.
Japanese Office Action for corresponding Japanese Application 2006-161022; mailed Apr. 19, 2011.

* cited by examiner

*Primary Examiner* — Ian N Moore
*Assistant Examiner* — Dung B Huynh
(74) *Attorney, Agent, or Firm* — Staas & Halsey LLP

(57) ABSTRACT

A web-mail system receives from a web server mail IDs assigned to clearly distinguish one e-mail from another among all the e-mails stored in a mail box, and transmits the mail IDs determined according to a scroll position in a list window to the web server, making a request for list information of those mail IDs. The web-mail system receives the requested list information from the web server and stores the list information in a list information storage unit. The web-mail system creates a list to be displayed in a list the list window based on the list information stored in the list information storage unit.

7 Claims, 21 Drawing Sheets

FIG.5

| USER ID | MAIL ID | NUMBER OF MAILS |
|---|---|---|
| 1 | 1,2,3···200 | 200 |
| 2 | 1,2,3···50 | 50 |
| 3 | 1,2,3···70 | 70 |
| 4 | 1,2,3···30 | 30 |
| ⋮ | ⋮ | ⋮ |

FIG.6

| | USER ID: 1 | |
|---|---|---|
| MAIL ID | LIST INFORMATION | |
| 1 | ·PROCESSING RESULT INFORMATION<br>·DATA REQUIRED FOR MAIL LISTING —FROM ADDRESS<br>  —READ/UNREAD STATUS         —SENT DATE<br>  —DEGREE OF IMPORTANCE   —LABEL<br>  —PROCESSING DATE               (COLOR OF SUBJECT)<br>  —REPLAY STATUS                    —MAIL SIZE<br>  —FLAG                                      —MASSAGE ID<br>  —SUBJECT                             —FORWARDED STATUS<br>  —NEWLY ARRIVING MAIL INFO   —SENDER<br>                                                    —ATTACHMENT STATUS | USER ID: 2 |
| 2 | ·PROCESSING RESULT INFORMATION<br>·DATA REQUIRED FOR MAIL LISTING —FROM ADDRESS<br>  —READ/UNREAD STATUS         —SENT DATE<br>  —DEGREE OF IMPORTANCE   —LABEL<br>  —PROCESSING DATE               (COLOR OF SUBJECT)<br>  —REPLAY STATUS                    —MAIL SIZE<br>  —FLAG                                      —MASSAGE ID<br>  —SUBJECT                             —FORWARDED STATUS<br>  —NEWLY ARRIVING MAIL INFO   —SENDER<br>                                                    —ATTACHMENT STATUS | |
| ⋮ | ⋮ | |

FIG.7

| MAIL ID | MAIL CONTENT INFORMATION |
|---|---|
| 1 | HELLO! THANKS FOR YOUR HELP THE OTHER DAY. REGARDS. |
| 2 | LET'S MEET AT 10:00. |
| ⋮ | ⋮ |

USER ID: 1
USER ID: 2

FIG.8

```
{
 "m":[
  {
   "u":"0",
   "p":"3",
   "pd":"",
   "re":"0",
   "fl":"0",
   "su":"SCREEN IMAGE ATTACHMENT",
   "rc":"0",
   "fr":"XXX YYYYY <xxxxx,yyy@jp,fujitsu,com>",
   "d":"2006/03/15 15:48:48",
   "l":"0",
   "pm":"I am sam-test01",
   "si":"80451",
   "i":"38",
   "fw":"0",
   "ps":"",
   "t":"mailarchiver@cigar,nagano,fujitsu,com",
   "a":"1"
  },
  {
   "u":"0",
   "p":"3",
   "pd":"",
   "re":"0",
   "fl":"0",
   "su":"ENVIRONMENT - POWER-OFF CHECKING REGISTER",
   "rc":"0",
   "fr":"Hogefuga Foo <xxxxyyyy@jp,fujitsu,com>",
   "d":"2006/03/15 10:01:31",
   "l":"0",
```

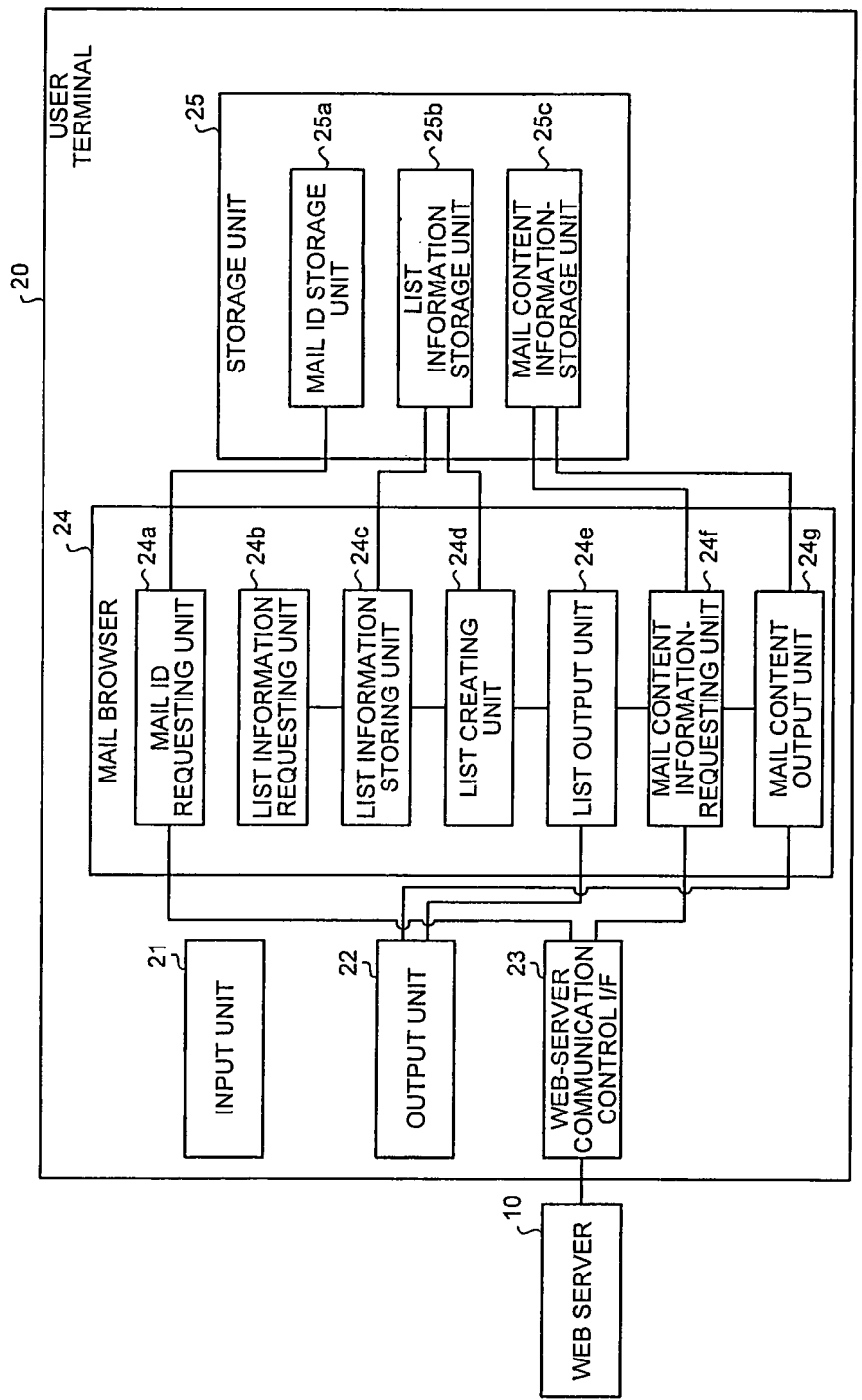

FIG.10

| MAIL ID | NUMBER OF MAILS |
|---|---|
| 1,2,3···200 | 200 |

FIG.11

| MAIL ID | LIST INFORMATION |
|---|---|
| 1 | ・PROCESSING RESULT INFORMATION<br>・DATA REQUIRED FOR MAIL LISTING<br>　—READ/UNREAD STATUS　　　　—FROM ADDRESS<br>　—DEGREE OF IMPORTANCE　　—SENT DATE<br>　—PROCESSING DATE　　　　　—LABEL<br>　—REPLAY STATUS　　　　　　　(COLOR OF SUBJECT)<br>　—FLAG　　　　　　　　　　　　—MAIL SIZE<br>　—SUBJECT　　　　　　　　　　—MASSAGE ID<br>　—NEWLY ARRIVING MAIL INFO　—FORWARDED STATUS<br>　　　　　　　　　　　　　　　　　—SENDER<br>　　　　　　　　　　　　　　　　　—ATTACHMENT STATUS |
| 2 | ・PROCESSING RESULT INFORMATION<br>・DATA REQUIRED FOR MAIL LISTING<br>　—READ/UNREAD STATUS　　　　—FROM ADDRESS<br>　—DEGREE OF IMPORTANCE　　—SENT DATE<br>　—PROCESSING DATE　　　　　—LABEL<br>　—REPLAY STATUS　　　　　　　(COLOR OF SUBJECT)<br>　—FLAG　　　　　　　　　　　　—MAIL SIZE<br>　—SUBJECT　　　　　　　　　　—MASSAGE ID<br>　—NEWLY ARRIVING MAIL INFO　—FORWARDED STATUS<br>　　　　　　　　　　　　　　　　　—SENDER<br>　　　　　　　　　　　　　　　　　—ATTACHMENT STATUS |
| ⋮ | ⋮ |

FIG.12

| MAIL ID | MAIL CONTENT INFORMATION |
|---|---|
| 1 | HELLO! THANKS FOR YOUR HELP THE OTHER DAY. REGARDS. |
| 2 | LET'S MEET AT 10:00. |
| ⋮ | ⋮ |

METHOD, APPARATUS, AND COMPUTER-READABLE RECORDING MEDIUM FOR DISPLAYING MAIL LIST OR LIST AND FOR MANAGING MAIL

BACKGROUND OF THE INVENTION

1. Field of the Invention

The present invention relates to a computer-readable recording medium for displaying mail list and a computer-readable recording medium for managing mail that display in a scrollable window of a display unit, a list of e-mails stored in a mailbox of a server connected over a network.

2. Description of the Related Art

There are available web-mail software (hereinafter, "web-mail") that enable electronic mail (e-mails) to be perused on a browser software rather than a mailer software. In a typical web-mail, only subjects of the e-mails in the mailbox are received previously and displayed in the form of a list on a terminal, and then the content corresponding to the subject selected by the user is downloaded from the mailbox.

If a large number of e-mails is involved, the web-mail displays the list of subjects of the e-mails one screenful (say, ten subjects) at a time. When an instruction for displaying the next ten items in the list is received, the web-mail receives the next ten items from the mailbox and displays them (for example, Japanese Patent Application Laid-open No. 2000-222301).

A technology for refreshing display data without necessitating reloading is available in the form of Asynchronous JavaScript (registered trademark)+XML (Ajax, an asynchronous communication technology). A web-mail using Ajax receives list of subjects of all the e-mails from the mailbox regardless of read and unread, creates a list based on the information received, and displays the list. In addition, the web-mail using Ajax also asynchronously retrieves and stores the contents of the e-mails even before receiving a request to retrieve the contents.

In the web-mail, when the number of e-mails in the mailbox warrants the subjects to be displayed a screenful at a time, the user needs to give the appropriate instruction to display the next page (this operation causes the browser screen to be reloaded). Therefore, the user cannot peruse all the subjects continuously, leading to poor operability.

In the web-mail that uses Ajax, after selecting a mailbox, subjects of all the e-mail are received from the mailbox. Therefore, if the number of e-mails in the selected mailbox is considerable, it will take considerable time to receive the subjects of all the e-mails from the mailbox. Thus, the duration from the time the mailbox is selected up until the time the subjects are displayed is virtually wasted, again leading to poor operability.

In addition, mailer software can be considered to improve operability. However, mailer software generally send and receive mail directly without a mediating server, thus jeopardizing security.

SUMMARY OF THE INVENTION

It is an object of the present invention to at least partially solve the problems in the conventional technology.

According to one aspect of the present invention, a computer-readable recording medium that stores therein a mail list display program that causes a computer to display in a scrollable window of a display unit a list of e-mails stored in a mailbox of a server connected over a network, the mail list display program causing the computer to execute: firstly receiving from the server, identification data assigned to distinguish one e-mail from another for all the e-mails stored in the mailbox; sending to the server the identification data of the e-mails corresponding to a scroll position of the window with respect to all the e-mails the identification data of which are received, and making a request for list data used for list display of the e-mails; secondly receiving from the server, the list data of the e-mails corresponding to the identification data requested in sending; storing the list data received in the secondly receiving in a predetermined list data storage unit; and outputting a list to be currently displayed to the window created based on the list data stored in the list data storage unit.

According to another aspect of the present invention, a computer-readable recording medium that stores therein a mail management program that causes a computer to manage e-mails stored in a mailbox provided for each user and connected to a user terminal over a network, the mail management program causing the computer to execute: firstly storing in a predetermined identification data storage unit, identification data assigned to distinguish one e-mail from another of all the e-mails stored in the mailbox; secondly storing list data used for list display of each of the e-mails on the user terminal in a predetermined list data storage unit in an associated form with the identification data stored in the identification data storage unit; firstly sending the identification data of the e-mails stored in the identification data storage unit upon request from the user terminal with respect to all the e-mails stored in the mailbox of the user corresponding to the user terminal; and secondly sending the list data corresponding to the received identification data by reading out from the list data storage unit, when a request for list data along with the identification data of the e-mails are received from the user terminal.

According to still another aspect of the present invention, a computer-readable recording medium that stores therein a mail list display program that causes a computer to display in a scrollable window of a display unit a list of e-mails stored in a mailbox of a server connected over a network, the mail list display program causing the computer to execute: firstly receiving from the server, identification data assigned to distinguish one e-mail from another for e-mails stored in the mailbox; setting a position of a pointer in a scroll bar in the window according to a position of e-mails to be displayed in the window as a list among the e-mails whose identification data is received, sending the identification data of the e-mails corresponding to the set position of the pointer to the server, and making a request for list data used for list display of the e-mails; secondly receiving from the server, the list data of the e-mails corresponding to the identification data requested in sending; storing the list data received in the secondly receiving in a predetermined list data storage unit; and outputting a list to be currently displayed to the window created based on the list data stored in the list data storage unit.

According to still another aspect of the present invention, a computer-readable recording medium that stores therein a list display program that causes a computer to display in a scrollable window of a display unit a list of data files stored in a predetermined folder in a server connected over a network, the list display program causing the computer to execute: firstly receiving from the server, identification data assigned to distinguish one data file from another for data files stored in the folder; setting a position of a pointer in a scroll bar in the window according to a position of data files to be displayed in the window as a list among the data files whose identification data is received, sending the identification data of the data files corresponding to the set position of the pointer to the server, and making a request for list data used for list display of the data files; secondly receiving from the server, the list data of the data files corresponding to the identification data requested in the sending; and creating a list in the window based on the list data received in the secondly receiving, and outputting the list to the window.

According to still another aspect of the present invention, a computer-readable recording medium that stores therein a list display program that causes a computer to display in a scrollable window of a display unit a list of data files stored in a predetermined folder in a server connected over a network, the list display program causing the computer to execute: receiving from the server, identification data assigned to distinguish one data file from another for data files stored in the folder; setting a position of a pointer in a scroll bar in the window according to a position of data files to be displayed in the window as a list among the data files whose identification data is received, creating and outputting a list to the window based on the identification data received in the receiving.

According to still another aspect of the present invention, a mail list display apparatus that displays in a scrollable window of a display unit a list of e-mails stored in a mailbox of a server connected over a network, the mail list display apparatus includes an identification data receiving unit that receives from the server, identification data assigned to distinguish one e-mail from another of all the e-mails stored in the mailbox; an identification data sending unit that send to the server the identification data of the e-mails corresponding to a scroll position of the window with respect to all the e-mails the identification data of which are received, and makes a request for list data used for list display of the e-mails; a list data receiving unit that receives from the server the list data of the e-mails corresponding to the identification data requested by the identification data sending unit; a list data storing unit that stores the list data received by the list data receiving unit in a predetermined list data storage unit; and a list outputting unit that outputs a list to be currently displayed to the window created based on the list data stored in the list data storage unit.

According to still another aspect of the present invention, a mail list display method that displays in a scrollable window of a display unit a list of e-mails stored in a mailbox of a server connected over a network, the method includes firstly receiving from the server, identification data assigned to distinguish one e-mail from another of all the e-mails stored in the mailbox; sending to the server the identification data of the e-mails corresponding to a scroll position of the window with respect to all the e-mails the identification data of which are received, and making a request for list data used for list display of the e-mails; secondly receiving from the server, the list data of the e-mails corresponding to the identification data requested in sending; storing the list data received in the secondly receiving in a predetermined list data storage unit; and outputting a list to be currently displayed to the window created based on the list data stored in the list data storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic view of a mail ID database;

FIG. 6 is a schematic view of a list information database;

FIG. 7 is a schematic view of a mail content information database;

FIG. 8 is a schematic view of list information received by a user terminal;

FIG. 9 is a block diagram of the user terminal according to the first embodiment;

Figure 10:
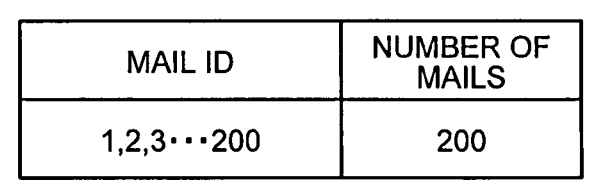

FIG. 10 is a schematic view for explaining a mail ID storage unit;

FIG. 11 is a schematic view for explaining a list information storage unit;

FIG. 12 is a schematic view for explaining a mail content information storage unit;

DETAILED DESCRIPTION OF THE PREFERRED EMBODIMENTS

Exemplary embodiments of the mail list display program and the mail management program according to the present invention are explained in detail below with reference to the accompanying drawings.

An overview and the salient feature of a web-mail system according to a first embodiment of the present invention are described first, followed by a configuration and process flow of the web-mail system, and finally, the effects due to the first embodiment.

Figure 1:
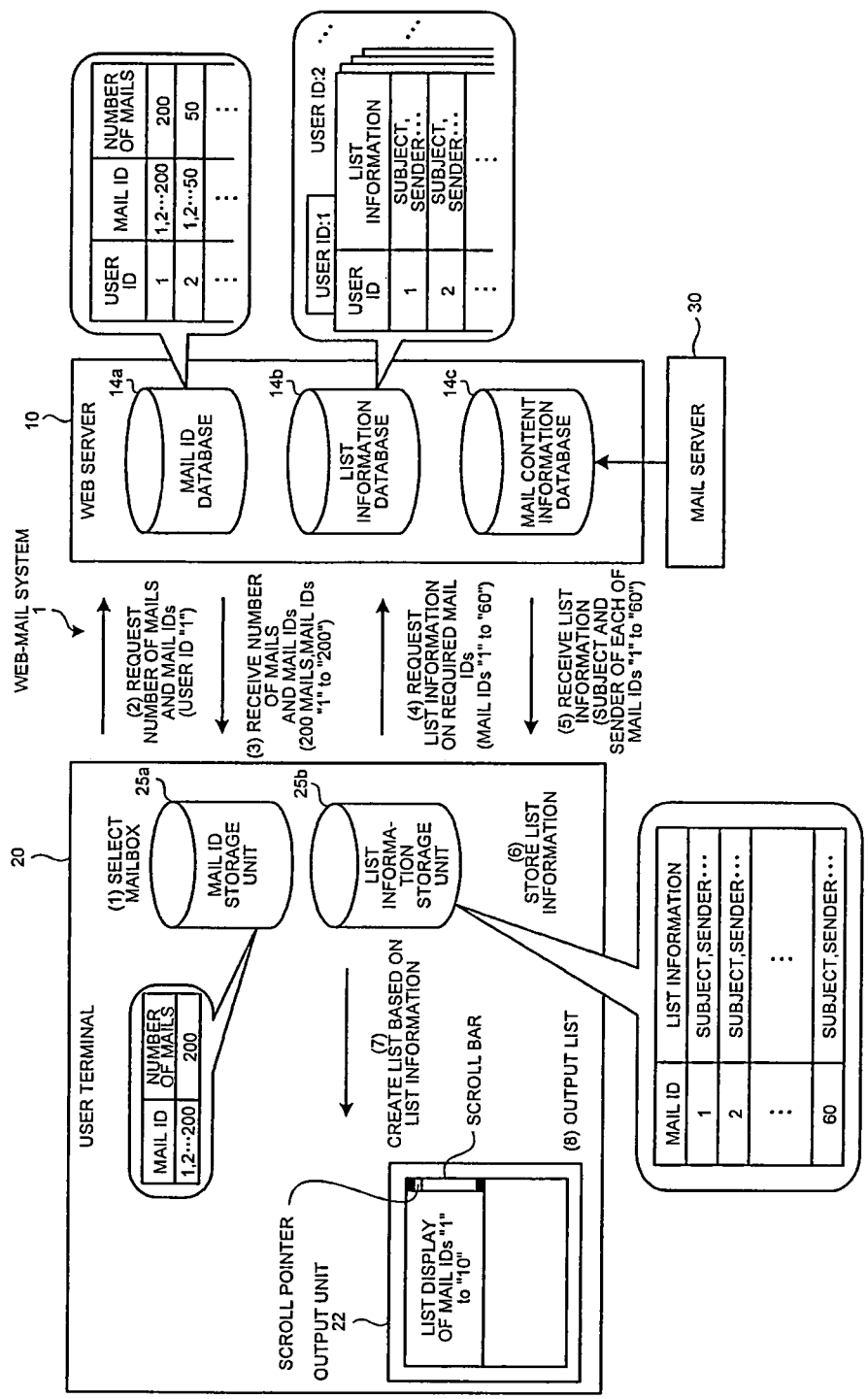
FIG. 1 is a schematic view for explaining an overview and salient feature of a web-mail system according to a first embodiment of the present invention.
Figure 2:
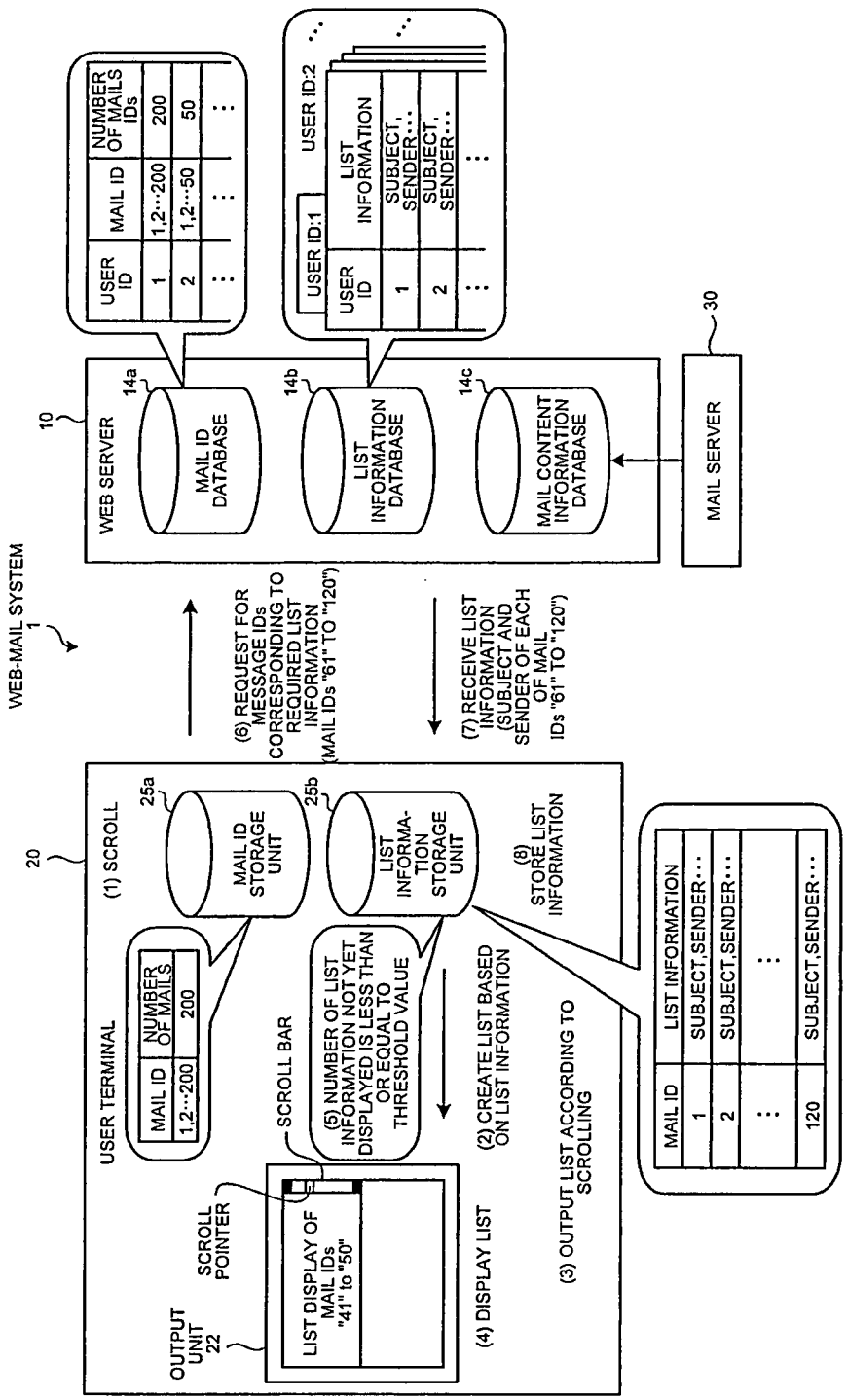
FIG. 2 is a schematic view for explaining the overview and the salient feature of the web-mail system according to the first embodiment.
Figure 3:
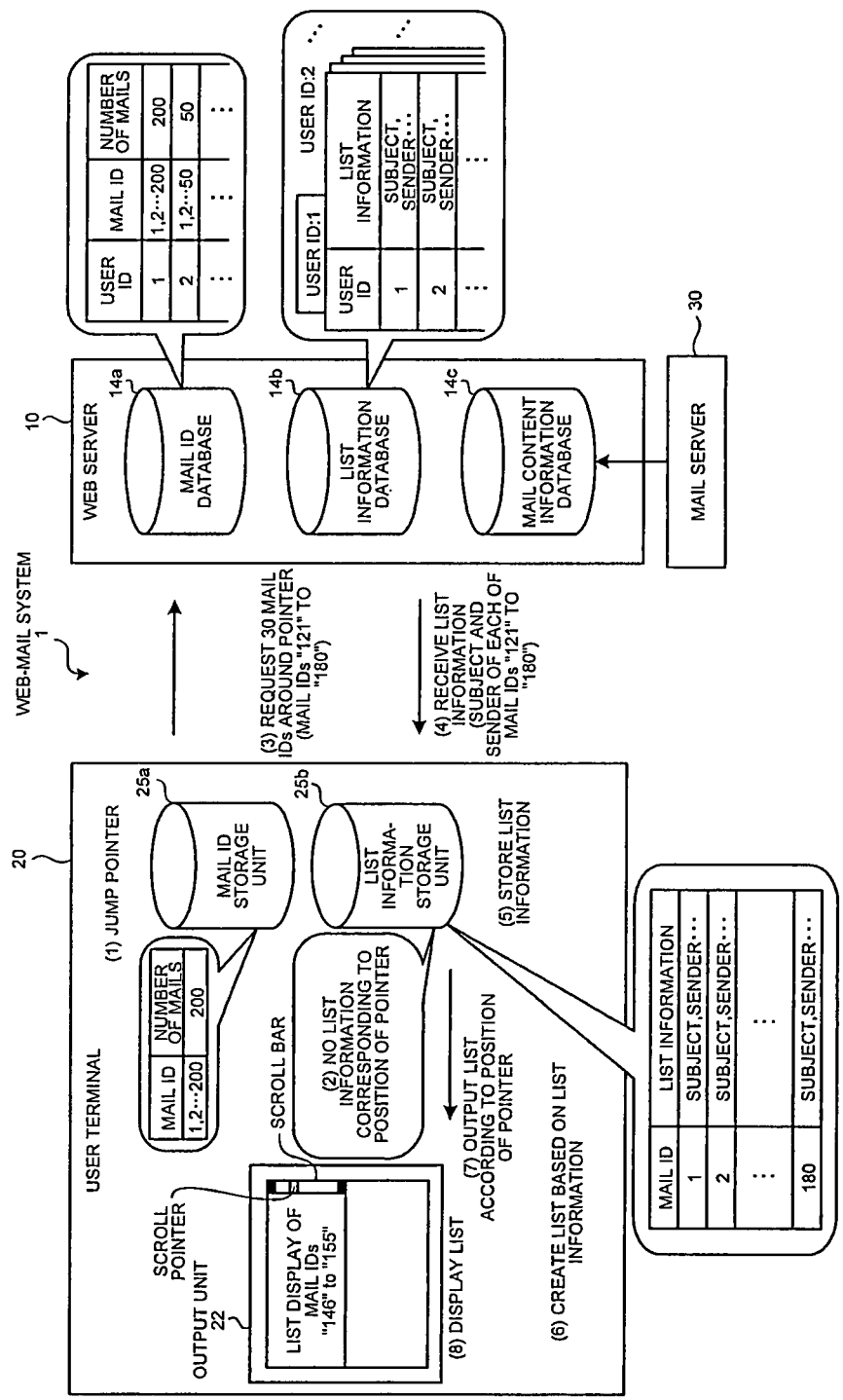
FIG. 3 is a schematic view for explaining the overview and the salient feature of the web-mail system according to the first embodiment.

The overview and salient feature of a web-mail system 1 according to the first embodiment is explained first with reference to FIGS. 1 to 3. FIGS. 1 to 3 are schematic views for explaining the overview and salient feature of the web-mail system according to the first embodiment.

As shown in FIG. 1, the web-mail system 1 according to the first embodiment includes a web server 10 that manages e-mails as well as provides a mail service, and a user terminal 20 (such as a personal computer, work station, home-use gaming console, internet TV, or a mobile communication terminal such as a Personal Digital Assistant (PDA), mobile phone, or personal handy-phone system (PHS)) that can accesses at least the web server 10. The web server 10 and the user terminal 20 are communicably connected via a network (such as the Internet, local area network (LAN), etc.). In addition, a mail server 30 that includes a user mailbox is communicably connected over the network to the web server 10.

The web-mail system 1 according to the first embodiment displays the e-mails stored in the mailbox in a scrollable list window of a display unit of the user terminal 20, providing enhanced operability to the user without in any way jeopardizing security.

The web server 10 of the web-mail system 1 according to the first embodiment accesses the mail server 30 upon request from the user terminal 20 (alternatively, accesses the mail server 30 at regular intervals, irrespective of whether there is a request from the user terminal 20), receives the e-mails stored in the mailboxes, and creates a mail ID database 14a, a list information database 14b, and a mail content information database 14c, as shown in FIG. 1.

The mail ID database 14a contains, in a correlated manner where the user ID is assigned to each user to clearly distinguish him/her from the other users, the mail ID assigned to each e-mail in the mailbox of every user to clearly distinguish one e-mail from another, and the total count of the mail IDs (that is, the total number of e-mails). The list information database 14b contains, in an associated form, the mail ID and list information (for example, subject, sender, etc.) required for displaying the e-mails in the form of a list on the user terminal 20. The mail content information database 14c contains, in an associated form, the mail ID and mail content information required for displaying the mail content on the user terminal 20.

When the user accesses the web server 10 via the user terminal 20 and selects his/her mailbox (see (1) of FIG. 1), by the act of sending the user ID to the web server 10, the user makes a request for all the mail IDs of all the e-mails stored in the mailbox and the total count of the mail IDs associated with the user ID (see (2) of FIG. 1). Specifically, the user terminal 20 sends the user ID "1" to the web server 10.

According to the request from the user terminal 20, the web server 10 reads from the mail ID database 14a the mail IDs and the total count of the mail IDs corresponding to the user ID and sends the mail IDs and the total count of the mail IDs to the user terminal 20. The user terminal 20 stores the mail IDs and the total count of the mail IDs received from the web server 10 in a mail ID storage unit 25a (see (3) of FIG. 1). Specifically, the web server 10 sends to the user terminal 20 the mail IDs "1" to "200" and a value "200" as the total count of the mail IDs, which correspond to the user ID "1", and the user terminal 20 stores the mail IDs "1" to "200" and the value "200" in the mail ID storage unit 25a.

The user terminal 20 sends to the web server 10 the mail IDs of the e-mails corresponding to the scroll position in the list window, making a request for the list information for those mail IDs required for list display of the e-mails. If the list is being displayed for the first time, the user terminal 20 supposes that the scroll pointer is positioned at the top of the scroll bar in the list window, and sends a predetermined number of mail IDs to the web server 10 (see (4) of FIG. 1). Specifically, if the number of mail IDs of e-mails displayed at a time in the list window is ten, the user terminal 20 determines a set lot of mail IDs to be sent to the web server 10 by including a predetermined number of (for example, 25) mail IDs each preceding and following the displayed ten items (that is, 60 items), and sends the mail IDs in set lots (for example, the mail IDs "1" to "60"), starting from the first mail ID, to the web server 10, making a request for the list information corresponding to those mail IDs.

Upon receiving the request for the list information and the mail IDs from the user terminal 20, the web server 10 reads from the list information database 14b the list information corresponding to the mail IDs and sends the list information to the user terminal 20 (see (5) of FIG. 1). The user terminal 20 stores the list information received from the web server 10 associating it with its respective mail ID in a list information storage unit 25b (see (6) of FIG. 1). Specifically, the web server 10 reads the list information corresponding to the mail IDs "1" to "60" from the list information database 14b and sends the list information of the mail IDs "1" to "60" to the user terminal 20. The user terminal 20 stores the mail information of the mail IDs "1" to "60" in the list information storage unit 25b.

The user terminal 20 creates a list to be currently displayed in the list window and outputs the list to the list window based on the list information stored in the list information storage unit 25b (see (7) and (8) of FIG. 1). Specifically, if it is supposed that the scroll pointer of the scroll bar in the list window to be at the first item, and that the user terminal 20 receives the list information corresponding to each of the mail IDs in the set lot starting from the first mail ID (for example, the list information corresponding to each of the mail IDs "1" to "60"), the user terminal 20 creates a list to be currently displayed in the list window by using the list information of one screenful lot of mail ID starting from the first mail ID (for example, the list information of the mail IDs "1" to "10"), and outputs the list to the list window. When outputting the list to the list window, the user terminal 20 also sets the position of the scroll pointer in the scroll bar to the position containing the items to be displayed (in this example, the first item), sets the size of the scroll pointer in terms of the ratio of displayed number of items to the total number of items (in this example, ten items of 200 items), and outputs the scroll bar with these settings to the list window.

The overview and salient feature of the web-mail system 1 is continued with reference to FIG. 2. Upon receiving an instruction that the list has been scrolled through the scroll bar (see (1) of FIG. 2), the user terminal 20 creates the list to be currently displayed in the list window according to the position of the scroll pointer in the scroll bar, and outputs the list to the list window (see (2) to (4) in FIG. 2). Specifically, supposing that the user terminal 20 has received the list information of all the mail IDs of the set lot starting from the first mail ID (that is, the list information of the mail IDs "1" to "60"), upon receiving an instruction that the list has been scrolled so that the position of the scroll pointer moves to the position "11th item to 20th item" from the first item, the user terminal 20 creates a list to be currently displayed in the list window using the list information corresponding to the 11th item to the 20th item (for example, the list information corresponding to the mail IDs "11" to "20"), and outputs the list to the list window. When outputting the list, the user terminal 20 sets the scroll pointer in the scroll bar at the position containing the items to be displayed (in this example, at the position "11th item to 20th item" from the first item).

At the same time as creating and outputting the list to be currently displayed in the list window according to the scroll position, the user terminal 20 also monitors the scroll pointer position in the list information stored in the list information storage unit 25b. Specifically, the user terminal 20 monitors whether, from among the list information stored in the list information storage unit 25b, the number of list information yet to be displayed in the list window in a scroll progression direction becomes less than or equal to a predetermined threshold value (for example, ten items) (see (5) of FIG. 2). More specifically, supposing that the user terminal 20 has received the list information of all the mail IDs of the set lot starting from the first mail ID (that is, the list information of the mail IDs "1" to "60"), the user terminal 20 monitors whether the user terminal 20 receives a moving instruction such that the scroll pointer is positioned at the 50th item from the first item.

As a result of monitoring the scroll pointer position, when it is determined that the number of list information not yet displayed in the list window becomes less than or equal to the threshold value, the user terminal 20 sends to the web server 10 the next predetermined set lot of mail IDs successive to the previous set lot in the scroll progression direction, and makes a new request for the list information corresponding to those mail IDs (see (6) of FIG. 2). Specifically, upon receiving an instruction that the list has been scrolled so that the scroll pointer is positioned at the 50th item from the first item, the user terminal 20 sends to the web server 10 the predetermined set lot (60 items) of mail IDs successive to the mail ID "60" (for example, the mail IDs "61" to "120"), making a request for the list information corresponding to those mail IDs.

Upon receiving the request for the list information and the mail IDs from the user terminal 20, the web server 10, as explained with reference to FIG. 1, reads from the list information database 14*b* the list information corresponding to the mail IDs and sends the list information to the user terminal 20 (see (7) of FIG. 2). The user terminal 20 stores the list information received from the web server 10 associating it with its respective mail ID in the list information storage unit 25*b* (see (8) of FIG. 2). Specifically, the web server 10 reads the list information corresponding to the mail IDs "61" to "120" from the list information database 14*b* and sends the list information of the mail IDs "61" to "120" to the user terminal 20. The user terminal 20 stores the mail information of the mail IDs "61" to "120" in the list information storage unit 25*b*. As a result, the user terminal 20 now has the list information corresponding to the mail IDs "1" to "120" and using the list information creates the list to be displayed in the list window according to the scroll position, and outputs the list to the list window (see (1) to (4) of FIG. 2).

The overview and salient feature of the web-mail system 1 is continued with reference to FIG. 3. Concurrently with creating and outputting to the list window the list according to the scroll position, the user terminal 20 monitors the scroll pointer position to check if the number of list information not yet displayed in the list window becomes less than or equal to the threshold value (for example, ten items). The user terminal 20 also monitors whether, due to over-scrolling, the scroll pointer has moved to a position giving rise to a condition wherein the list information to be currently displayed in the list window is not available in the list information storage unit 25*b* (see (1) and (2) of FIG. 3). Specifically, supposing that the user terminal 20 has received the list information of all the mail IDs of the set lot starting from the first mail ID (that is, the list information of the mail IDs "1" to "60"), the user terminal 20 monitors whether the scroll pointer has moved to a position beyond the 60th item in response to an over-scroll instruction.

As a result of monitoring the scroll pointer position, when it is determined that the scroll pointer has moved to a position giving rise to a condition wherein the list information to be currently displayed in the list window is not available in the list information storage unit 25*b*, the user terminal 20 adds a predetermined number of items (say, 25 items) each to the first item and the last item in the new screenful of items to be displayed in the list window to create a set lot (say, 60 items), and sends the set lot of mail IDs to the web server 10, making a request for the list information corresponding to those mail IDs (see (3) of FIG. 3). Specifically, when the scroll pointer position jumps to the position "145th item to 155th item" while outputting to the list window the list of the mail IDs "1" to "10", the user terminal 20 sends to the web server 10 the mail IDs "121" to "180", making a request for the list information corresponding to those mail IDs.

Upon receiving the request for the list information and the mail IDs from the user terminal 20, the web server 10, as explained with reference to FIG. 1 and FIG. 2, reads from the list information database 14*b* the list information corresponding to the mail IDs and sends the list information to the user terminal 20 (see (4) of FIG. 3). The user terminal 20 stores the list information received from the web server 10 associating it with its respective mail ID in the list information storage unit 25*b* (see (5) of FIG. 3). Specifically, the web server 10 reads the list information corresponding to the mail IDs "121" to "180" from the list information database 14*b* and sends the list information of the mail IDs "121" to "180" to the user terminal 20. The user terminal 20 stores the mail information of the mail IDs "121" to "180" in the list information storage unit 25*b*.

The user terminal 20, using the list information stored in the list information storage unit 25*b*, creates the list to be displayed in the list window and outputs the list to the list window (see (6) to (8) of FIG. 3). Specifically, in the case described above, as the request for the list information is made when the scroll pointer moves to the position "145th item to 155th item", the user terminal 20 creates a list to be displayed in the list window using the list information corresponding to the 145th item to the 155th item (that is, the list information of the mail IDs "145" to "155") and outputs the list to the list window.

Thus, the web-mail system 1 manages all the e-mails at the server end, and receives, from among all the e-mails, the list information of only those e-mails to be currently displayed in the list window. Consequently, the waiting period required for communication is reduced. As the subject of all the e-mails can be perused successively according to the scroll position in the list window, the operability is enhanced while ensuring security.

Figure 4:
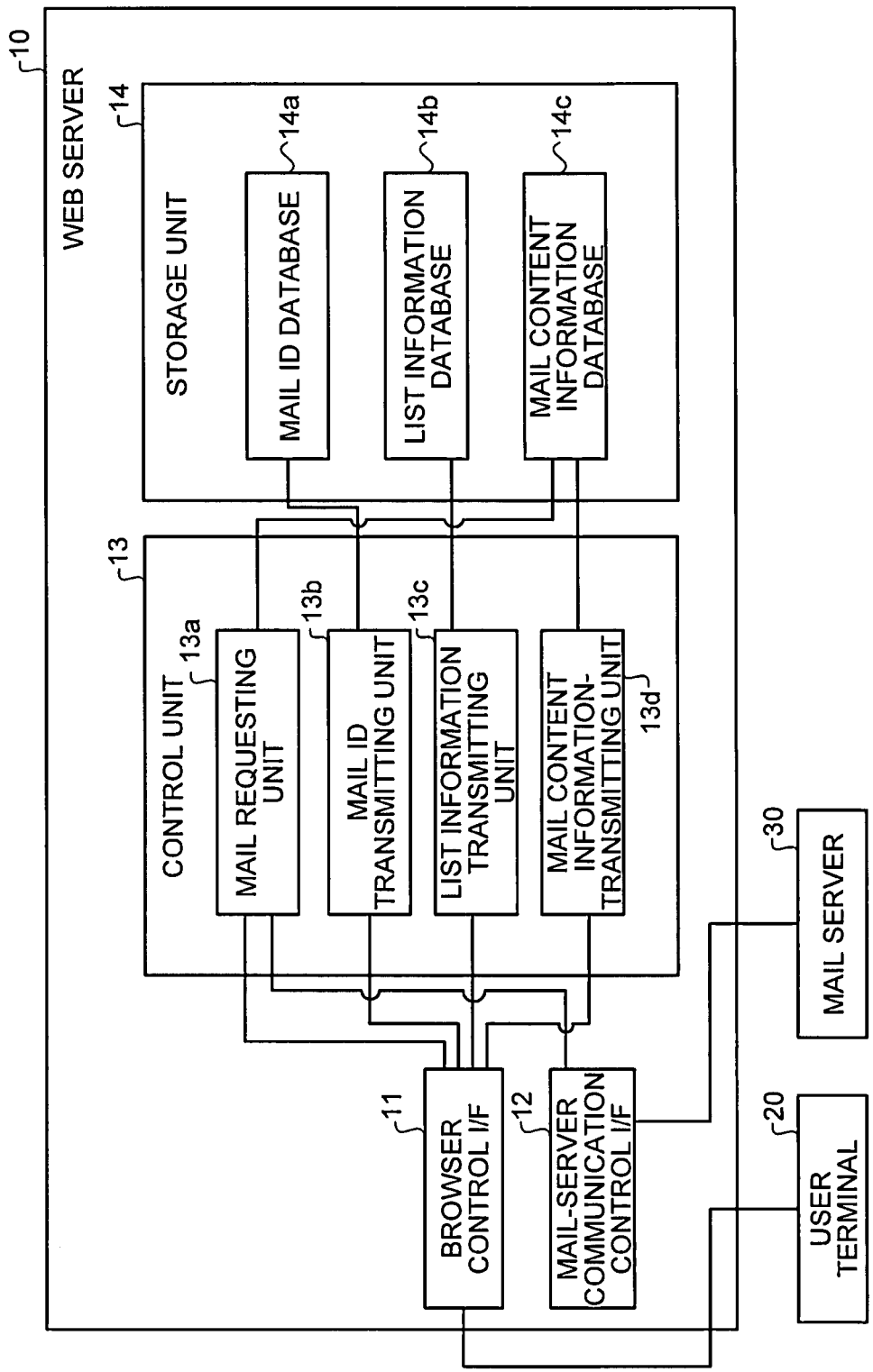
FIG. 4 is a block diagram of a web server according to the first embodiment.

A configuration of the web server 10 shown in FIGS. 1 to 3 is described below with reference to FIGS. 4 to 8. FIG. 4 is a block diagram of the web server 10 according to the first embodiment. FIG. 5 is a schematic view of the contents of the mail ID database. FIG. 6 is a schematic view of the contents of the list information database. FIG. 7 is a schematic view of the contents of the mail content information database. FIG. 8 is a schematic view of the list information received by the user terminal 20.

As shown in FIG. 4, the web server 10, connected to the user terminal 20 and the mail server 30, includes a browser control interface (I/F) 11, a mail-server communication control I/F 12, a control unit 13, and a storage unit 14.

The browser control I/F 11 controls communication in terms of exchange of various kinds of data between the web server 10 and the user terminal 20. Specifically, the browser control I/F 11 receives the user ID and the mail ID from the user terminal 20 and sends the mail IDs, the list information, and the mail content information to the user terminal 20.

The mail-server communication control I/F 12 controls communication in terms of exchange of various kinds of data between the web server 10 and the mail server 30. Specifically, the-mail-server communication control I/F 12 sends mailbox data to and receives mailbox data from the mail server 30.

The storage unit 14 stores therein data and computer programs required for various processes performed by the control unit 13. In close relevance to the present invention, the storage unit 14 stores therein the mail ID database 14a, the list information database 14b, and the mail content information database 14c.

The mail ID database 14a contains the mail IDs. Specifically, the mail ID database 14a, as shown in FIG. 5, contains, in a correlated form, the user ID assigned to each user to clearly distinguish him/her from the other users, the mail ID assigned to each e-mail in the mailbox of every user to clearly distinguish one e-mail from another, and the total count of the mail IDs (that is, the total number of e-mails).

The list information database 14b contains the list information. Specifically, the list information database 14b, as shown in FIG. 6, contains, in an associated form, the user ID and the list information (for example, subject, sender, etc.) required for displaying the e-mails in the form of a list on the user terminal 20. In addition, the list information database 14b also contains, as list information, processing result information, data required for mail listing, read/unread status, degree of importance, processing date, reply status, flag, subject, new arrival status, From address, dispatch date, label, mail size, message ID, forwarded status, sender, and attachment status indicating whether the e-mail is with or without attachment.

The mail content information database 14c, as shown in FIG. 7, contains, in an associated form, the mail ID and mail content information required for displaying the mail content on the user terminal 20.

The control unit 13 has an internal memory for storing therein computer programs and data required for various process procedures, and executes the process procedures using the computer programs and data. In close relevance to the present invention, the control unit 13 includes a mail requesting unit 13a, a mail ID transmitting unit 13b, a list information transmitting unit 13c, and a mail content information-transmitting unit 13d. The mail ID transmitting unit 13b, the list information transmitting unit 13c, and the mail content information-transmitting unit 13d correspond, respectively, to "identification data transmission step", "list information transmission step", and "mail content information transmission step".

The mail requesting unit 13a makes a request for the mail content information. Specifically, the mail requesting unit 13a accesses the mail server 30 either upon request from the user terminal 20 (or, at regular intervals, irrespective of whether there is a request from the user terminal 20), receives the e-mails stored in the various mailboxes, and creates the mail ID database 14a, the list information database 14b, and the mail content information database 14c shown in FIG. 1.

The mail ID transmitting unit 13b sends the mail IDs to the user terminal 20. Specifically, upon request from the user terminal 20, the mail ID transmitting unit 13b reads from the mail ID database 14a the mail IDs and the total count of the mail IDs corresponding to the user ID, and sends those mail IDs and the total count of the mail IDs to the user terminal 20.

The list information transmitting unit 13c sends the list information to the user terminal 20. Specifically, upon receiving a request for the list information from the user terminal 20, the list information transmitting unit 13c reads from the list information database 14b the list information corresponding to the mail IDs received from the user terminal 20, and sends the list information to the user terminal 20.

The mail content information-transmitting unit 13d sends the mail content information to the user terminal 20. Specifically, upon receiving from the user terminal 20 a request for the mail content information along with the mail IDs, the mail content information-transmitting unit 13d reads from the mail content information database 14c the mail content information corresponding to the mail IDs received from the user terminal 20, and sends the mail content information to the user terminal 20.

Figure 13:
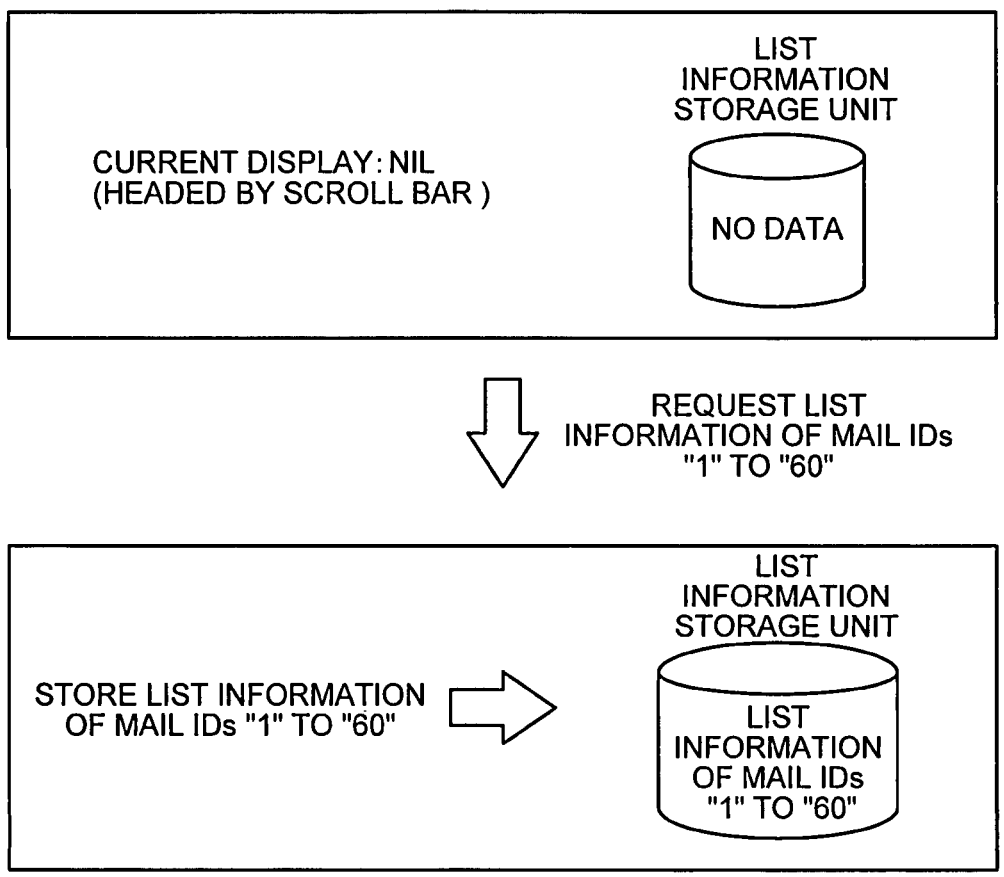
FIG. 13 is a schematic view for explaining a list information requesting unit.
Figure 14:
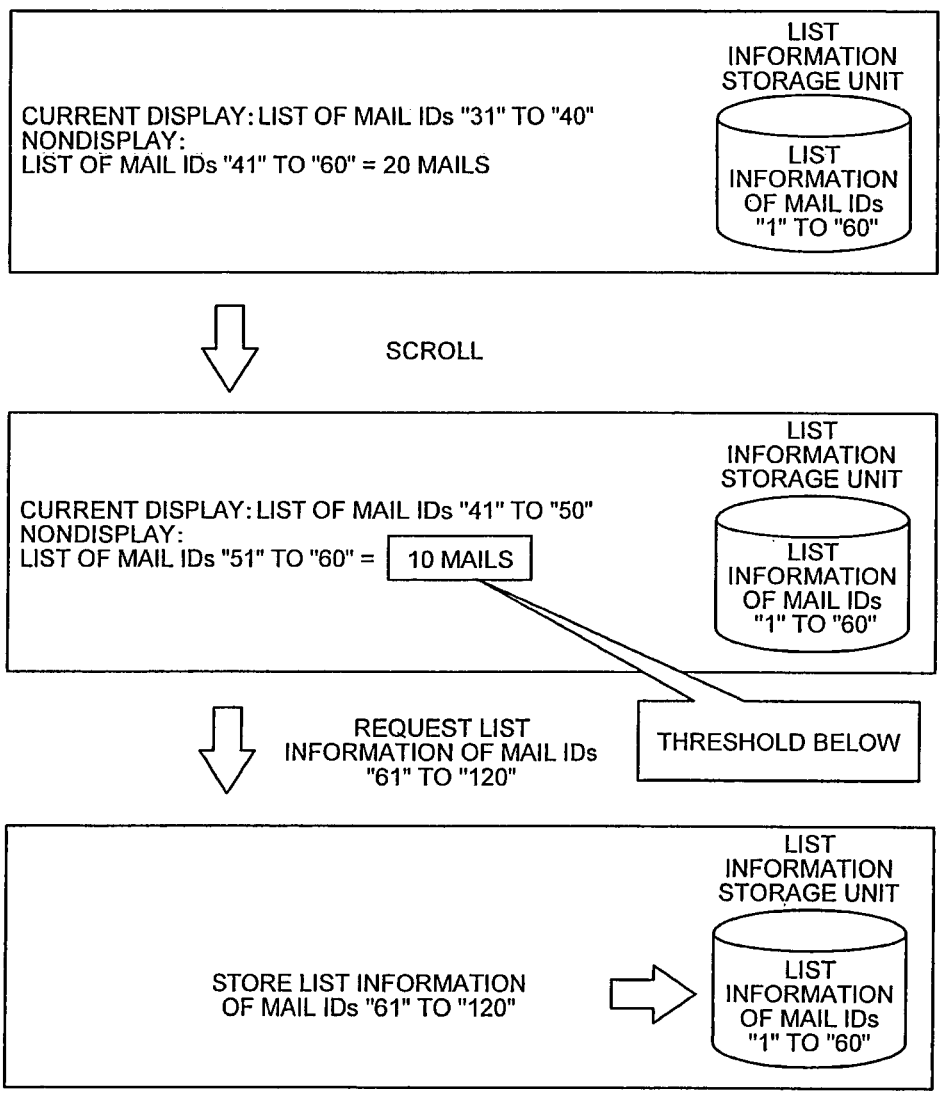
FIG. 14 is a schematic view for explaining the list information requesting unit.
Figure 15:
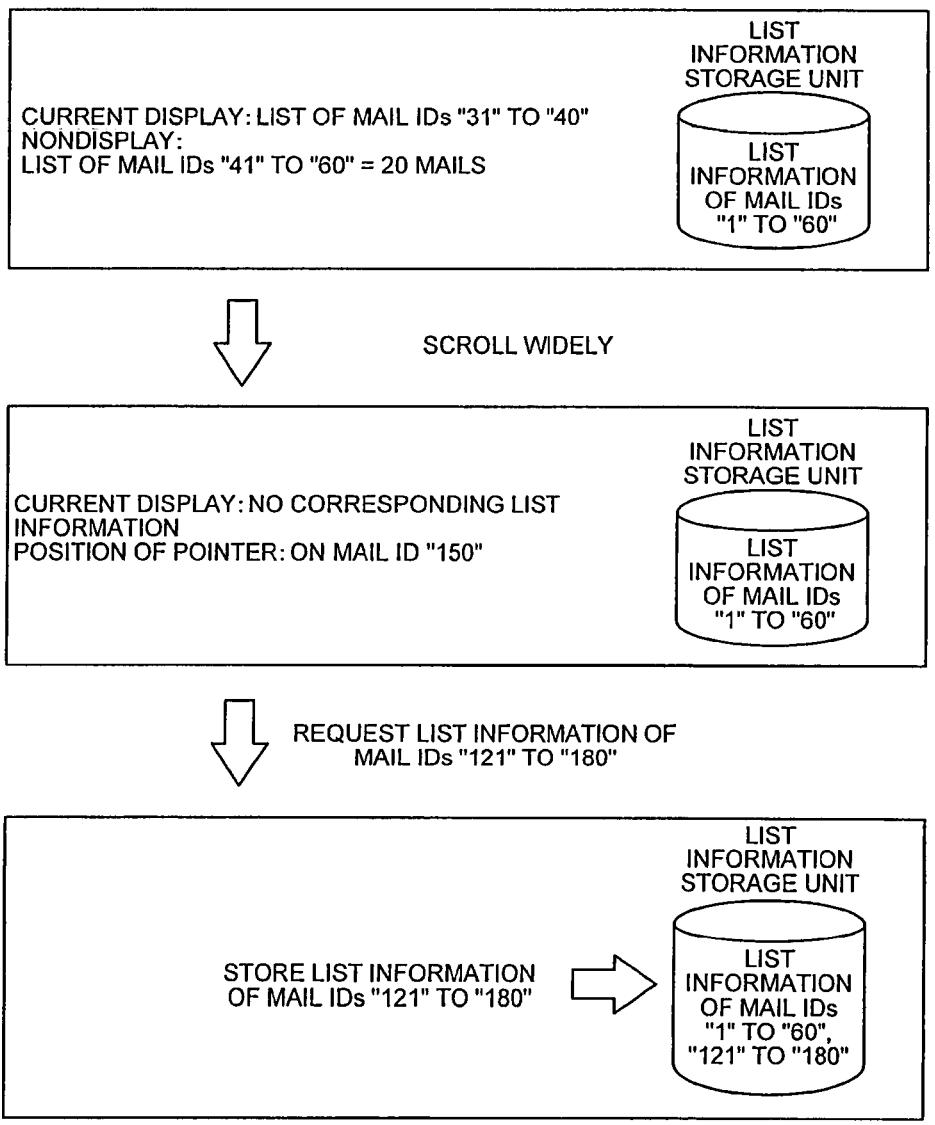
FIG. 15 is a schematic view for explaining the list information requesting unit.
Figure 16:
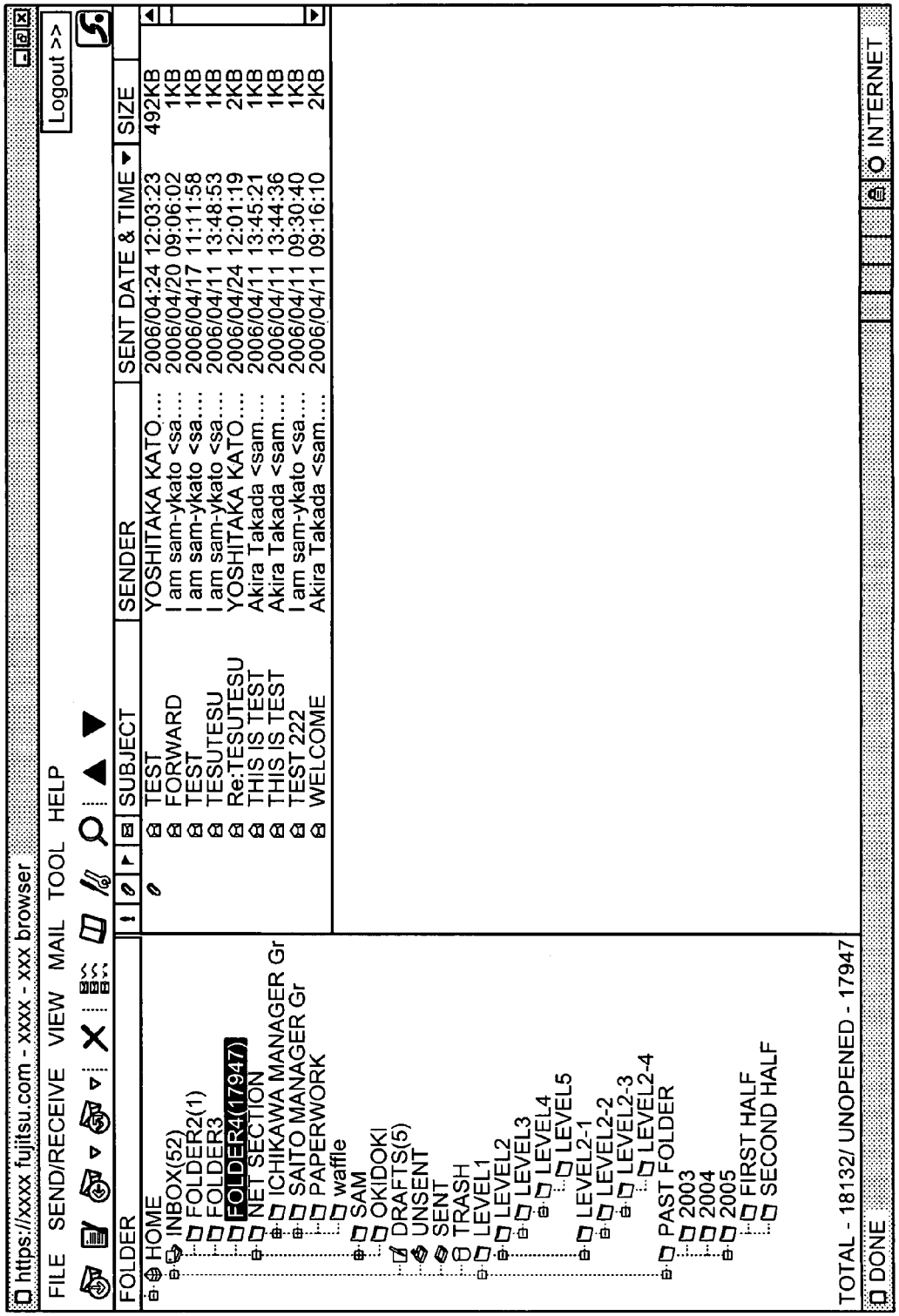
FIG. 16 is a schematic view of an example of a screen output to an output unit.
Figure 17:
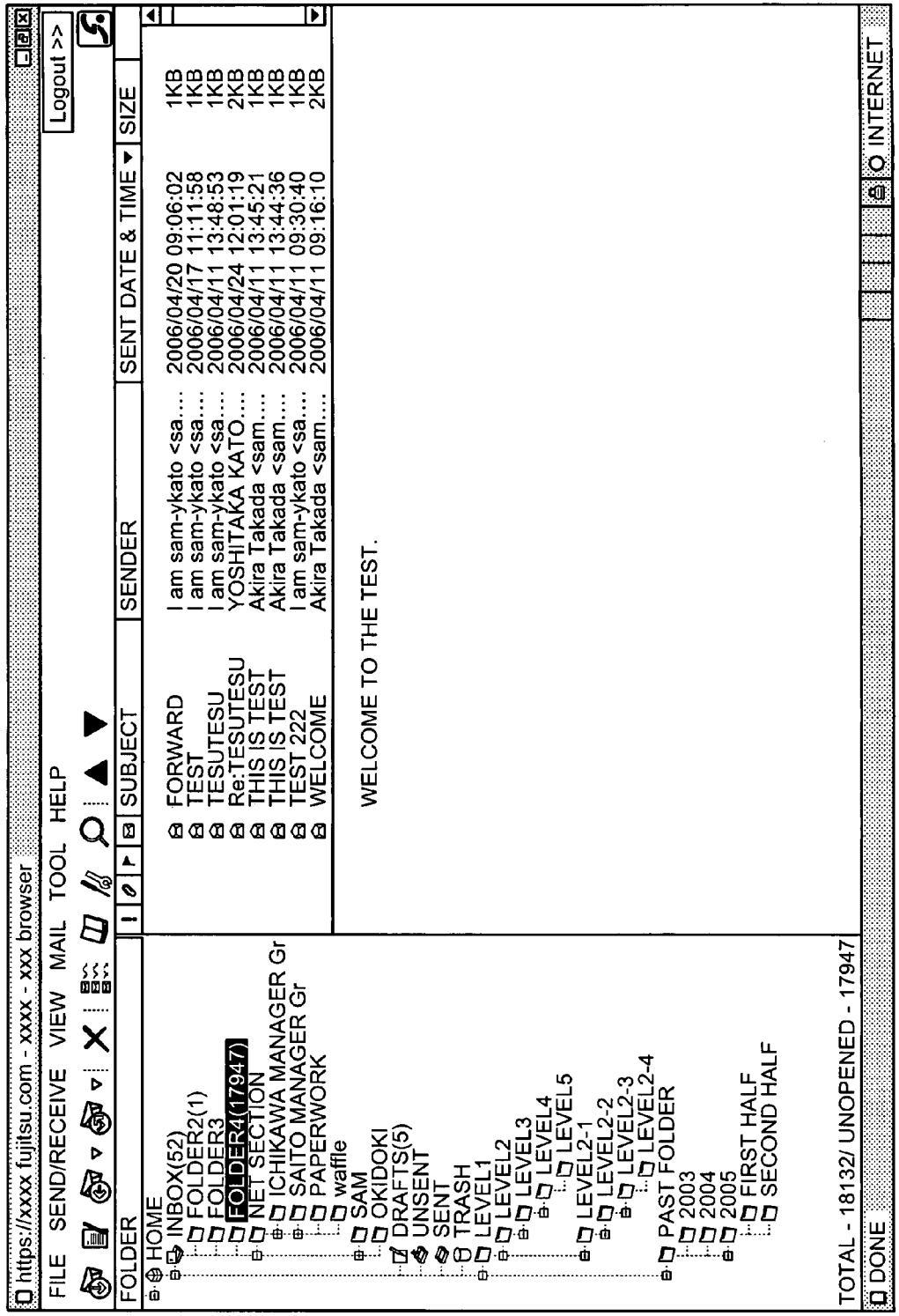
FIG. 17 is a schematic view of another example of a screen output to the output unit.

A configuration of the user terminal 20 shown in FIGS. 1 to 3 is described next with reference to FIGS. 9 to 17. FIG. 9 is a block diagram of the user terminal 20 according to the first embodiment. FIG. 10 is a schematic view for explaining the mail ID storage unit. FIG. 11 is a schematic view for explaining the list information storage unit. FIG. 12 is a schematic view for explaining a mail content information storage unit. FIGS. 13 to 15 are schematic views for explaining the list information requesting unit. FIGS. 16 and 17 are schematic views of screens output to an output unit.

As shown in FIG. 9, the user terminal 20 is connected to the web server 10, and includes an input unit 21, an output unit 22, a web-server communication control I/F 23, a mail browser 24, and a storage unit 25.

The input unit 21 accepts input in the form of mailbox selection instruction, scroll instruction, etc., and includes a keyboard, a mouse, a microphone and the like. The output unit 22 displays the mail list and the mail content, and includes a monitor (or a display, touch panel and the like), and speakers.

The web-server communication control I/F 23 controls communication in terms of exchange of various kinds of data between the user terminal 20 and the web server 10. Specifically, the web-server communication control I/F 23 receives the list information and the mail content information from and sends the user ID and the mail IDs to the web server 10.

The storage unit 25 stores therein data and computer programs required for various process procedures performed by the mail browser 24. In close relevance to the present invention, the storage unit 25 includes the mail ID storage unit 25a, the list information storage unit 25b, and a mail content information-storage unit 25c.

The mail ID storage unit 25a stores therein the mail IDs. Specifically, as shown in FIG. 10, the mail ID storage unit 25a stores therein, in an associated form, the mail IDs and the total count of the mail IDs received from the web server 10.

The list information storage unit 25b stores therein the list information. Specifically, as shown in FIG. 11, the list information storage unit 25b stores therein, in an associated form, the mail IDs and their list information received from the web server 10. As the list information, the list information storage unit 25b stores therein processing result information, data required for mail listing, read/unread status, degree of importance, processing date, reply status, flag, subject, new arrival status, From address, dispatch date, label, mail size, message ID, forwarded status, sender, and attachment status indicating whether the e-mail is with or without attachment.

The mail content information-storage unit 25c stores therein the mail content information. Specifically, as shown in FIG. 12, the mail content information-storage unit 25c stores therein, in an associated form, the mail IDs and the mail content information received from the web server 10.

The mail browser 24 includes an internal memory for storing therein computer programs and data required for various process procedures, and executes the process procedures using the computer programs and data. In close relevance to the present invention, the mail browser 24 includes a mail ID requesting unit 24a, a list information requesting unit 24b, a list information storing unit 24c, a list creating unit 24d, a list output unit 24e, a mail content information-requesting unit 24f, and a mail content output unit 24g. The term "identification data reception step" corresponds to the mail ID requesting unit 24a. Similarly, the terms "identification data transmission step" and "identification data reception step" correspond to the list information requesting unit 24b. The term "list information reception and storage step" corresponds to the list information storing unit 24c. The term "list output step" corresponds to the list output unit 24e. The terms "mail content information requesting step" and "mail content information reception step" in the claims correspond to the mail content information-requesting unit 24f. The term "mail content output step" corresponds to the mail content output unit 24g.

The mail ID requesting unit 24a makes a request to the web server 10 for the mail IDs that are assigned for clearly distinguishing one e-mail from another, and receives the mail IDs from the web server 10. Specifically, upon selection of a mailbox by a user, the mail ID requesting unit 24a sends the user ID to the web server 10, requesting the web server 10 for the mail IDs and the total count of the mail IDs stored in the mailbox selected by the user, and stores the mail IDs and the total count of the mail IDs received from the web server 10 in the mail ID storage unit 25a.

The list information requesting unit 24b makes a request to the web server 10 for the list information. Specifically, the list information requesting unit 24b sends to the web server 10 the mail IDs of the e-mails corresponding to the scroll position in the list window, and makes a request for the list information for those mail IDs required for list display of the e-mails.

A list information request process is explained in detail with reference to FIGS. 13 to 15. FIG. 13 is a schematic view for explaining the process of the list information requesting unit 24b when a request for the list information is made for the first time upon selection of a mailbox by a user. FIG. 14 is a schematic view for explaining the process of the list information requesting unit 24b when the list window is scrolled. FIG. 15 is a schematic view for explaining the process of the list information requesting unit 24b when the list window is over-scrolled.

As shown in FIG. 13, when the list is to be displayed for the first time in the list window, the list information requesting unit 24b supposes that the scroll pointer is at the top of the scroll bar in the list window, and sends a predetermined number of mail IDs (for example, the mail IDs "1" to "60") to the web server 10. Specifically, if the number of mail IDs of e-mails displayed at a time in the list window is ten, the list information requesting unit 24b determines a set lot of mail IDs to be sent to the web server 10 by including a predetermined number of (for example, 25) mail IDs each preceding and following the displayed ten items (that is, 60 items). The list information requesting unit 24b sends the mail IDs in set lots (for example, the mail IDs "1" to "60"), starting from the first mail ID, to the web server 10, makes a request for the list information corresponding to those mail IDs, and receives the requested list information. The list information storing unit 24c stores the list information (for example, the list information of the mail IDs "1" to "60") received from the web server 10 in the list information storage unit 25b.

As shown in FIG. 14, the list information requesting unit 24b monitors whether, from among the list information stored in the list information storage unit 25b, the number of list information yet to be displayed in the list window in a scroll progression direction becomes less than or equal to the threshold value (for example, ten items). More specifically, supposing that the user terminal 20 has received the list information of all the mail IDs of the set lot starting from the first mail ID (that is, the list information of the mail IDs "1" to "60"), the list information requesting unit 24b monitors whether the scroll pointer is positioned at the 50th item from the first item.

As a result of monitoring the scroll pointer position, when it is determined that the number of list information not yet displayed in the list window becomes less than or equal to the threshold value, the list information requesting unit 24b sends to the web server 10 the next predetermined set lot of mail IDs successive to the previous set lot in the scroll progression direction, and makes a new request for the list information corresponding to those mail IDs. Specifically, upon receiving an instruction that the list has been scrolled so that the scroll pointer is positioned at the 50th item from the first item, as shown in FIG. 14, the user terminal 20 sends to the web server 10 the predetermined set lot (60 items) of mail IDs successive to the mail ID "60" (for example, the mail IDs "61" to "120"), making a request for the list information corresponding to those mail IDs. The list information storing unit 24c described later stores the list information (for example, the list information of the mail IDs "61" to "120") in the list information storage unit 25b.

As shown in FIG. 15, concurrently with creating and outputting to the list window the list according to the scroll position, the list information requesting unit 24b monitors the scroll pointer position to check if the number of list information not yet displayed in the list window becomes less than or equal to the threshold value (for example, ten items). The list information requesting unit 24b also monitors whether, due to over-scrolling, the scroll pointer has moved to a position giving rise to a condition wherein the list information to be currently displayed in the list window is not available in the list information storage unit 25b (see (1) and (2) of FIG. 3). Specifically, supposing that the user terminal 20 has received the list information of all the mail IDs of the set lot starting from the first mail ID (that is, the list information of the mail IDs "1" to "60"), the list information requesting unit 24b monitors whether the scroll pointer has moved to a position beyond the 60th item in response to an over-scroll instruction.

As a result of monitoring the scroll pointer position, when it is determined that the scroll pointer has moved to a position giving rise to a condition wherein the list information to be currently displayed in the list window is not available in the list information storage unit 25b, as shown in FIG. 15, the list information requesting unit 24b adds a predetermined number of items (say, 25 items) each to the first item and the last item in the new screenful of items (say, 10 items) to be displayed in the list window to create a set lot (say, 60 items), sends the set lot of mail IDs to the web server 10, and makes a request for the list information corresponding to those mail IDs (see (3) of FIG. 3). Specifically, when the scroll pointer position jumps to the position "145th item to 155th item" while outputting to the list window the list of the mail IDs "1" to "10", the user terminal 20 sends to the web server 10 the mail IDs "121" to "180", and makes a request for the list information corresponding to those mail IDs. The list information storing unit 24c described later stores the list information (for example, the list information of the mail IDs "121" to "180") in the list information storage unit 25b.

The list information storing unit 24c stores the list information in the list information storage unit 25b. Specifically, the list information storing unit 24c stores the list information received from the web server 10 in an associated form with the mail IDs in the list information storage unit 25b.

The list creating unit 24d creates a list to be currently displayed in the list window and outputs the list to the list window based on the list information stored in the list information storage unit 25b. Specifically, if it is supposed that the scroll pointer of the scroll bar in the list window is to be at the first item, and that the user terminal 20 receives the list information corresponding to each of the mail IDs in the set lot starting from the first mail ID (for example, the list information corresponding to each of the mail IDs "1" to "60"), the list creating unit 24d creates a list to be currently displayed in the list window by using the list information of one screenful lot of mail ID starting from the first mail ID (for example, the list information of the mail IDs "1" to "10").

Supposing that the user terminal 20 has received the list information of all the mail IDs of the set lot starting from the first mail ID (that is, the list information of the mail IDs "1" to "60"), upon receiving an instruction that the list has been scrolled so that the position of the scroll pointer moves to the position "11th item to 20th item" from the first item, the list creating unit 24d creates a list to be currently displayed in the list window using the list information corresponding to the 11th item to the 20th item (for example, the list information corresponding to the mail IDs "11" to "20").

If it is determined that the scroll pointer has moved to a position giving rise to a condition wherein the list information to be currently displayed in the list window is not available in the list information storage unit 25b, the list creating unit 24d creates a list to be currently displayed in the list window based on the list information stored in the list information storage unit 25b.

The list output unit 24e outputs the list. Specifically, as shown in FIG. 16, the list output unit 24e displays the list created by the list creating unit 24d on the output unit 22.

The mail content information-requesting unit 24f makes a request to the web server 10 for the mail content information. Specifically, the mail content information-requesting unit 24f sends to the web server 10 the mail ID of the e-mail that is selected by the user using the input unit 21, and makes a request for the mail content information of the selected e-mail.

The mail content output unit 24g outputs the mail content to the output unit 22. Specifically, as shown in FIG. 17, the mail content output unit 24g outputs the mail content information received by the mail content information-requesting unit 24f to a mail content window, distinct from the list window.

Figure 18:
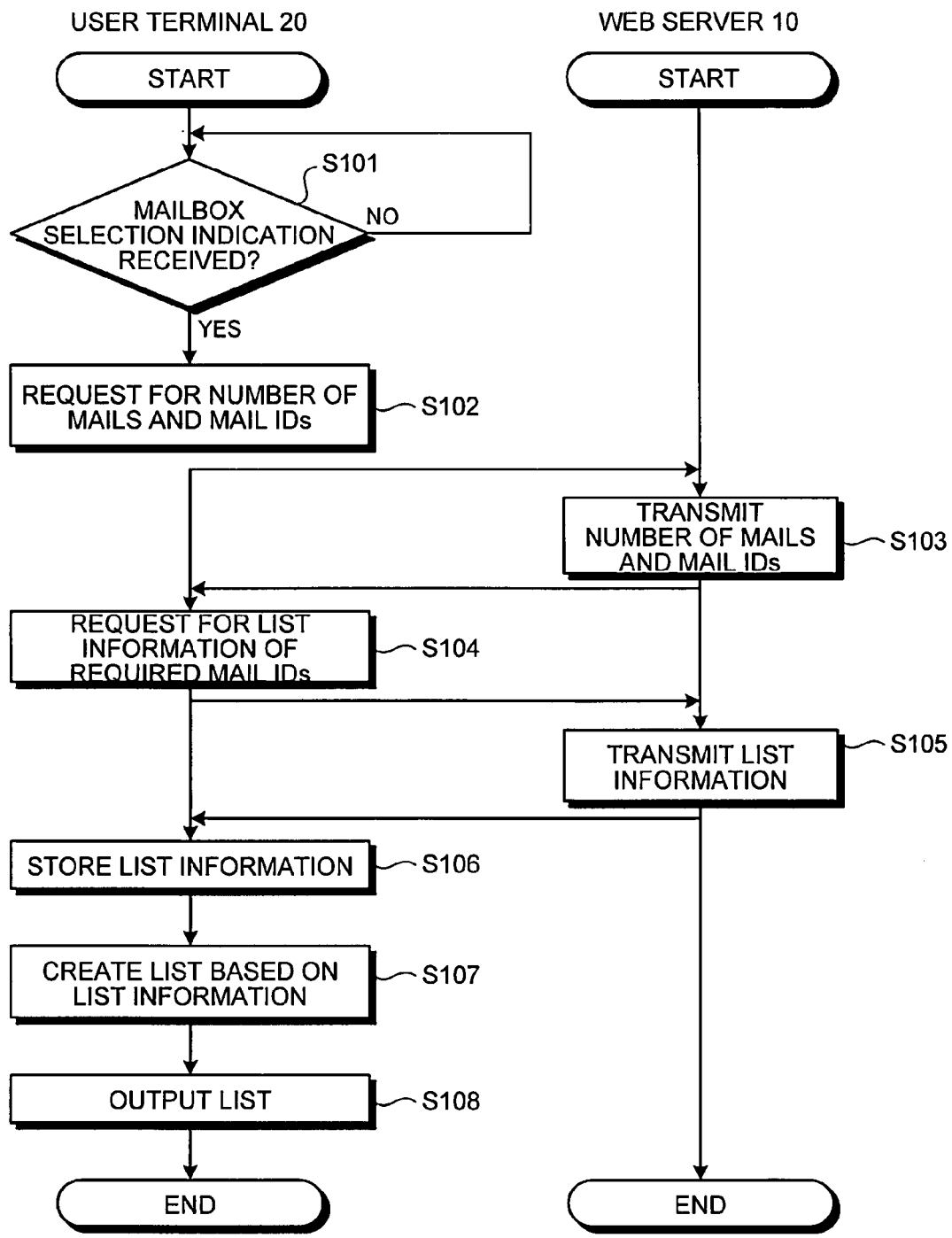
FIG. 18 is a flowchart of a process performed by the web-mail system according to the first embodiment.

The process performed by the web-mail system 1 according to the first embodiment upon selection of a user mailbox is described below. FIG. 18 is a flowchart of the process performed by the web-mail system 1 according to the first embodiment upon selection of a user mailbox.

Upon selection of a mailbox (Yes at step S101), the user terminal 20 sends to the web server 10 the user ID (for example, the user ID "1"), assigned to each user to clearly distinguish him/her from the other users, and makes a request for all the mail IDs of all the e-mails stored in the mailbox and the total count of the mail IDs associated with the user ID (step S102). Upon receiving the request from the user terminal 20, the web server 10 sends to the user terminal 20 the mail IDs and the total count of the mail IDs stored in the list information database 14b, as shown in FIG. 8 (step S103). The user terminal 20 stores the mail IDs and the total count of the mail IDs received from the web server 10 in the mail ID storage unit 25a.

Upon receiving the mail IDs and the total count of the mail IDs (for example, mail IDs "1" to "200" and "200"), the user terminal 20 sends to the web server 10 the mail IDs of the e-mails according to the scroll position (the scroll pointer position in the scroll bar) in the list window, and makes a request for the list information for those mail IDs required for list display of the e-mails (step S104). The web server 10, in response, sends the requested list information to the user terminal 20 (step S105)

The user terminal 20 stores the list information received from the web server 10 in the list information storage unit 25b (step S106), and based on the list information stored in the list information storage unit 25b, creates a list (for example, a list of ten items) to be currently displayed on the output unit 22, and outputs the list to the output unit 22 (step S107) for the list to be displayed (step S108).

Figure 19:
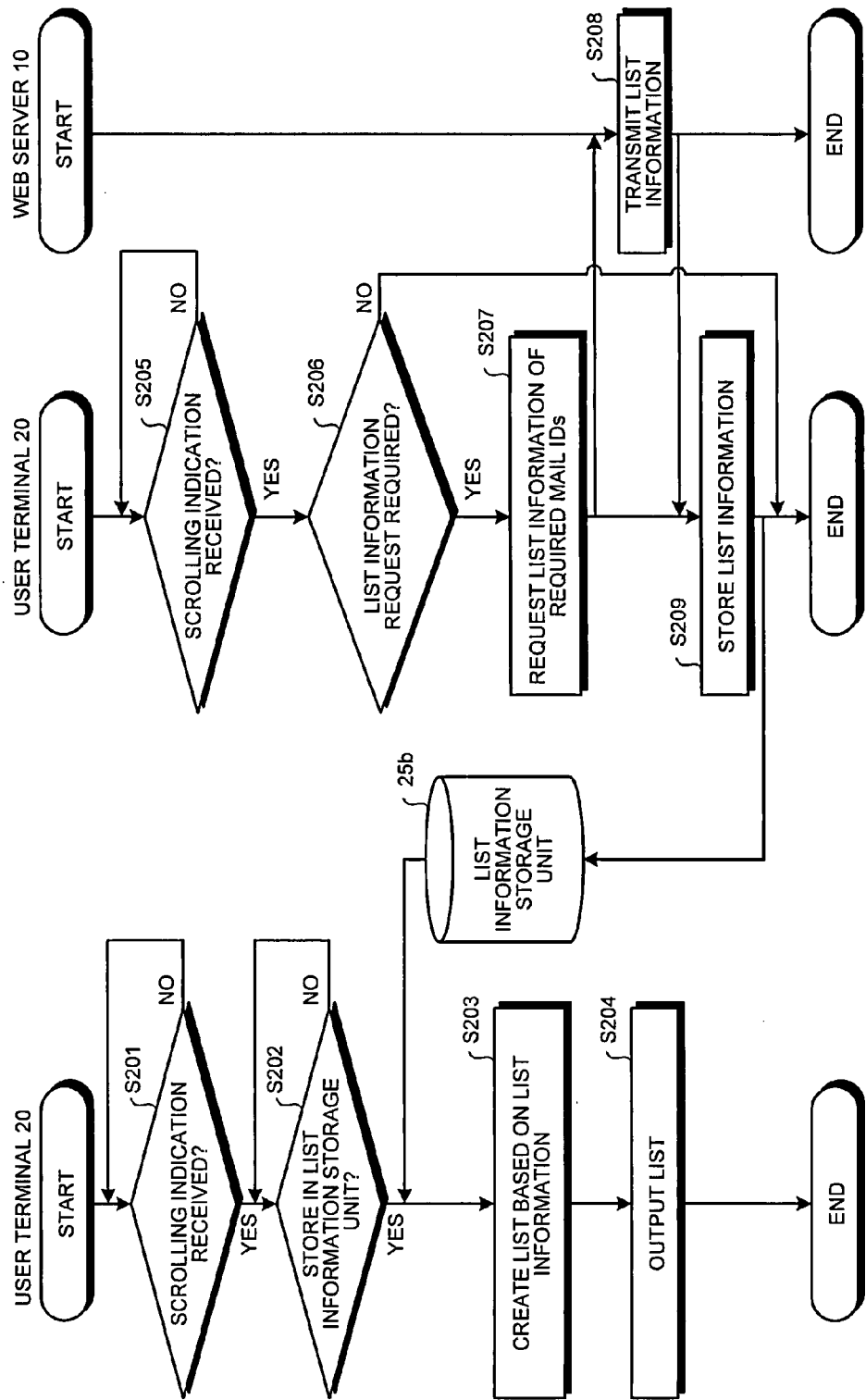
FIG. 19 is a flowchart of a process performed by the web-mail system according to the first embodiment when a list window is scrolled.

The process performed by the web-mail system 1 according to the first embodiment when the list window is scrolled is described below. FIG. 19 is a flowchart of the process performed by the web-mail system 1 according to the first embodiment when the list window is scrolled.

Upon receiving an instruction that the list has been scrolled through the scroll bar (step S201), and if list information to be displayed as a list on the output unit 22 is available in the list information storage unit 25b according to the scroll position (the position of the scroll pointer in the scroll bar) (Yes at step S202), the user terminal 20 creates a list based on the list information stored in the list information storage unit 25b (step S203) and outputs the list (for example, a list of ten items) according to the scroll position (according to the scroll pointer position in the scroll bar) to the output unit 22 (step S204).

Upon receiving an instruction that the list has been scrolled through the scroll bar (step S205), the user terminal 20 determines whether a request for the list information needs to be made (step S206). In other words, concurrently with creating and outputting to the list window the list according to the scroll pointer position, the user terminal 20 monitors the scroll pointer position to check if the number of list information not yet displayed in the list window becomes less than or equal to the threshold value (for example, ten items). The user terminal 20 also monitors whether, due to over-scrolling, the scroll pointer has moved to a position giving rise to a condition wherein the list information to be currently displayed in the list window is not available in the list information storage unit 25b. If it is determined that a request for the list information is not required (that is, if the number of list information not yet displayed in the list window is greater than the threshold value, or if the list information to be currently displayed in the list window is available in the list information storage unit 25b) (No at step S206), the user terminal 20 ends the process without making a request to the web server 10.

As a result of monitoring the scroll pointer position, when it is determined that the number of list information not yet displayed in the list window becomes less than or equal to the threshold value (Yes at step S206), the user terminal 20 sends to the web server 10 the next predetermined set lot of mail IDs successive to the previous set lot in the scroll progression direction, and makes a new request for the list information corresponding to those mail IDs (step S207). The web server 10, in response, sends the list information corresponding the mail IDs received from the user terminal 20 (step S208). The user terminal 20 stores the list information received from the web server 10 in the list information storage unit 25b (step S209). Thus, while the step S202 is being repeated as a result of a "No" at the step S202, due to the process that begins at the step S205 that runs concurrently with the process that begins at the step S201, the required data for list displaying is stored in the list information storage unit 25b, and the "No" at the step S202 becomes a "Yes" after the step S209.

As a result of monitoring the scroll pointer position, when it is determined that the scroll pointer has moved to a position giving rise to a condition wherein the list information to be currently displayed in the list window is not available in the list information storage unit 25b (yes at step S206), the user terminal 20 adds a predetermined number of items (say, 25 items) each to the first item and the last item in the new screenful of items to be displayed in the list window to create a set lot (say, 60 items), sends the set lot of mail IDs to the web server 10, and makes a request for the list information corresponding to those mail IDs (step S207). The web server 10, in response, sends the list information corresponding the mail IDs received from the user terminal 20 (step S208). The user terminal 20 stores the list information received from the web server 10 in the list information storage unit 25*b* (step S209).

Figure 20:
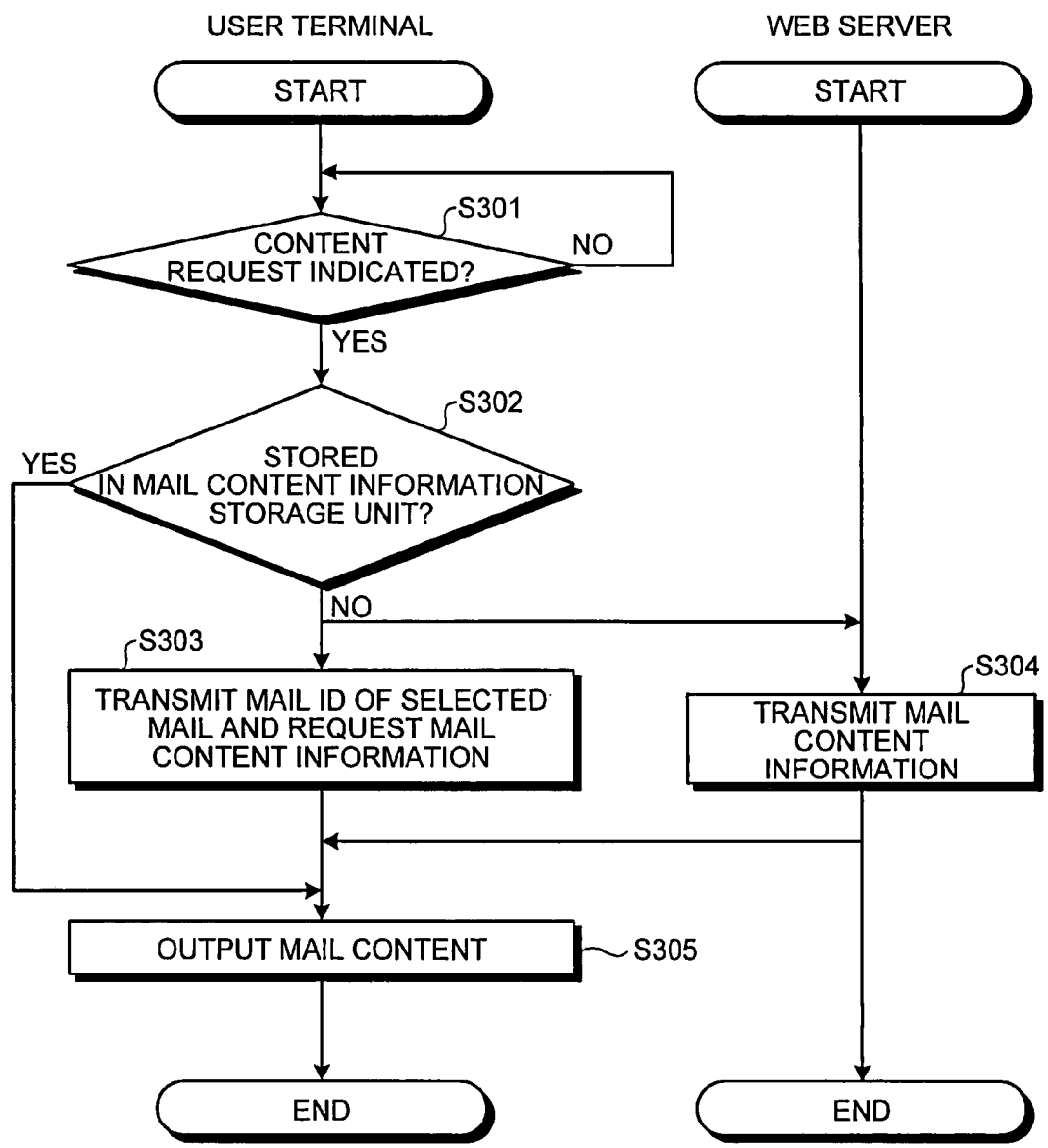
FIG. 20 is a flowchart of a mail content output process performed by the web-mail system.

A mail content output process performed by the web-mail system 1 according to the first embodiment is described below. FIG. 20 is a flowchart of the mail content output process performed by the web-mail system 1.

Upon receiving an instruction for perusing the mail content via the input unit 21 (Yes at step S301), the user terminal 20 determines whether the mail content information of the e-mail selected by the user is available in the mail content information-storage unit 25*c* (step S302). If available (Yes at step S302), the user terminal 20 outputs the mail content information to the output unit 22 (step S305).

If the mail content information requested by the user is not available in the mail content information-storage unit 25*c* (No at step S302), the user terminal 20 sends the mail ID of the e-mail to the web server 10 (step S303). The web server 10, in response, sends the mail content information corresponding to the mail ID to the user terminal 20 (step S304). The user terminal 20 then outputs the mail content information to the output unit 22 (step S305).

Thus, the web-mail system 1 receives from the web server 10 the mail IDs, assigned to clearly one e-mail from another, of all the e-mails stored in the mailbox, and sends to the web server 10 the mail IDs corresponding to the scroll position in the list window, and makes a request for the list information for those mail IDs. Upon receiving the list information from the web server 10, the web-mail system 1 stores the list information in the list information storage unit 25*b*, and creates the list to be displayed in the list window based on the list information stored in the list information storage unit 25*b*. Consequently, by receiving the list information of only those e-mails to be currently displayed in the list window, the web-mail system 1 has a reduced waiting period required for communication. As the subject of all the e-mails can be perused successively according to the scroll position in the list window, the operability is enhanced. Further, all the e-mails are managed at the web server 10 end, ensuring security.

According to the first embodiment, if the list information of the e-mails to be displayed in the list window is not available in the list information storage unit 25*b*, the web-mail system 1 sends to the web server 10 the mail IDs of a predetermined number of e-mails before and after the mail IDs of the e-mails to be displayed in the list window. Consequently, in the event of displaying the list window for the first time or over-scrolling, the web-mail system 1 is already in possession of list information of other e-mails before and after the ones that are to be displayed in the list window and can quickly create a list without having to make a fresh request for the list information corresponding to subsequent scroll operations, realizing enhanced operability.

According to the first embodiment, from among the list information stored in the list information storage unit 25*b*, if the number of list information not yet displayed in the list window in the scroll progression direction falls below a predetermined threshold value, the web-mail system 1 sends to the web server 10 a predetermined number of successive mail IDs in the scroll progression direction and obtains the list information of those mail IDs ahead of time. Therefore, a list can be quickly created based on the available list information without having to make a fresh request for the list information corresponding to subsequent scroll operations, realizing enhanced operability.

According to the first embodiment, upon receiving a request for perusing mail content of a particular e-mail from an input unit, the web-mail system 1 sends the mail ID of the e-mail to the server, making a request for the mail content information of the e-mail, receives the mail content information, and outputs the received mail content information to the mail content window, separate from the list window.

According to the first embodiment, the mail IDs, assigned to distinguish one e-mail from another, of all the e-mails stored in the user-specific mailbox are stored in the mail ID database 14*a*. The list information required for list display on the user terminal 20 is stored in an associated form with the mail ID in the list information database 14*b*. Upon request from the user terminal 20, the web-mail system 1 sends the mail IDs stored in the mail ID database 14*a* of all the e-mails stored in the mailbox of the user corresponding to the user terminal 20. Upon receiving from the user terminal 20 a request for list information along with the mail IDs of e-mails, the web-mail system 1 sends to the user terminal 20 the list information corresponding to the received mail IDs from the list information database 14*b*. Consequently, by receiving the list information of only those e-mails to be currently displayed in the list window, the web-mail system 1 has a reduced waiting period required for communication. As the subject of all the e-mails can be perused successively according to the scroll position in the list window, the operability is enhanced. Further, all the e-mails are managed at the web server 10 end, ensuring security.

The constituent elements of the devices illustrated are merely conceptual and may not necessarily physically resemble the structures shown in the drawings. For instance, the devices need not necessarily have the structure that is illustrated. The apparatus as a whole or in parts can be broken down or integrated either functionally or physically in accordance with the load or how the device is to be used. For example, the mail ID requesting unit 24*a* and the list information requesting unit 24*b* can be integrated. The process functions performed by the devices can be entirely or partially realized by a central processing unit (CPU) or a computer program executed by the CPU or by a hardware using wired logic.

Figure 21:
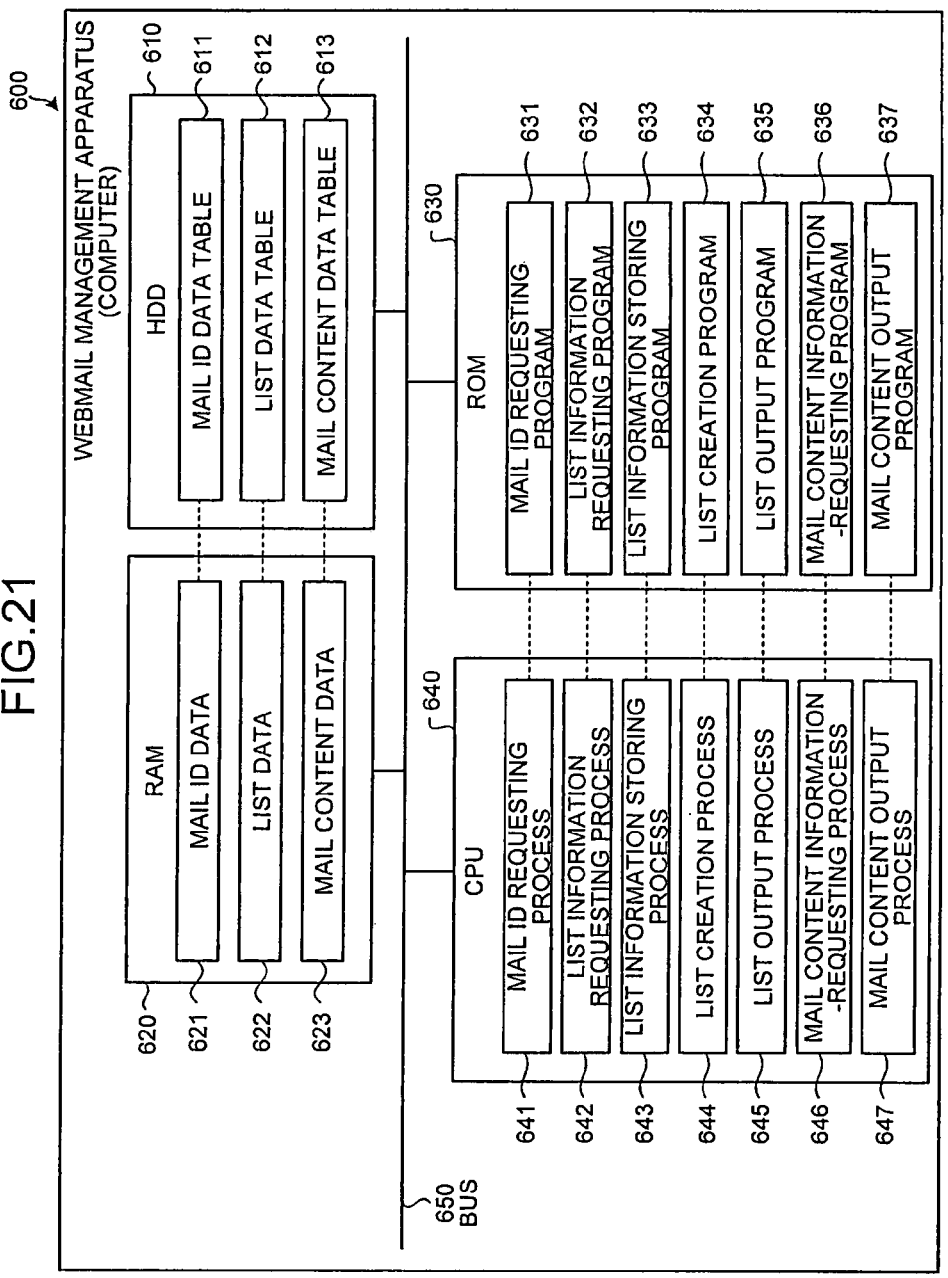
FIG. 21 is a block diagram of a computer that functions as the web-mail system.

The various processes described in the first embodiment can be realized by having a computer such as a personal computer or a workstation execute a ready program. A computer that executes a program to realize functions described in the first embodiment is described below. FIG. 21 is a block diagram of a computer that functions as the web-mail system.

A computer 600 that functions as the web-mail system includes a hard disk drive (HDD) 610, a random access memory (RAM) 620, a read-only memory (ROM) 630, and a CPU 640, all of which are connected to a bus 650.

The ROM 630 stores therein various computer programs for demonstrating the web-mail system according to the first embodiment, namely, a mail ID requesting program 631, a list information requesting program 632, a list information storing program 633, a list creation program 634, a list output program 635, a mail content information-requesting program 636, and a mail content output program 637. The computer programs can be integrated or left as separate programs, as required, similar to the constituent elements of the user terminal 20 shown in FIG. 9.

The CPU 640 reads the programs 631 to 637 from the ROM 630 and executes them as a mail ID requesting process 641, a list information requesting process 642, a list information storing process 643, a list creation process 644, a list output process 645, a mail content information-requesting process 646, and a mail content output process 647, respectively. The processes 641 to 647 correspond, respectively, to the mail ID requesting unit 24a, the list information requesting unit 24b, the list information storing unit 24c, the list creating unit 24d, the list output unit 24e, the mail content information-requesting unit 24f, and the mail content output unit 24g of the user terminal 20 shown in FIG. 9.

As shown in FIG. 21, the HDD 610 stores therein a mail ID data table 611, a list data table 612, and a mail content data table 613, which correspond, respectively, to the mail ID storage unit 25a, the list information storage unit 25b, and the mail content information-storage unit 25c of the user terminal 20 shown in FIG. 9. The CPU 640 stores mail ID data 621 in the mail ID storage unit 25a, list data 622 in the list information storage unit 25b, and mail content data 623 in the mail content information-storage unit 25c, as well as reads the mail ID data 621, the list data 622, and the mail content data 623, respectively, from the mail ID storage unit 25a, the list data the list information storage unit 25b, and the mail content information-storage unit 25c, storing them in the RAM 620 and managing the e-mails based on the mail ID data 621, the list data 622, and the mail content data 623 stored in the RAM 620.

The web-mail system according to the first embodiment of the present invention is explained above. The present invention, however, is not limited to such a system. The technical concept of the present invention can be applied effectively for displaying on a first computer a list of data stored in a second computer which is communicably connected to the first computer.

For example, the web server 10 and the mail server 30 shown in FIG. 1 can be replaced with a data server which manages plural data files (possibly including mail data). Needless to say, the data server stores identification data and file names of the data files for their unique identification. Substantial contents of the data files may be stored on other computer which is communicably connected to the data server. The user terminal 20 is provided with an application for displaying a list of data files.

With the above changes in the configuration of the system, the data server transmits information concerning the data files to the user terminal 20 in response to a request sent from the user terminal 20. The processes of the system can be represented by the flowchart of FIG. 18, when the "web server 10" in FIG. 18 is replaced with the "data server" and some additional changes are made.

According to the first embodiment, the user terminal 20 receives a mail box selection indication in step S101 of FIG. 18. On the other hand, in this modification, the user terminal 20 receives an indication of a folder which stores data files to be displayed as a list, and sends information concerning the indicated folder to the data server in step S102. The data server sends the number of data files stored in the indicated folder and identification data for uniquely identifying each of the data files to the user terminal 20 in step S103. In step S104, the user terminal 20 makes a request for list information for list display based on a position of a pointer in the scroll bar provided in the list window for the data files of the received numbers. In step S103, the data server may send only the number of data files to the user terminal 20.

In another modification of the first embodiment, the processes from step S102 to step S105 shown in FIG. 18 may be further simplified. The file name is uniquely set for each data file, and is used as list information. Utilizing such a characteristic of the file name, the data server may merge and execute the processes in step S103 and step S105 when responding to the transmission of folder information from the user terminal 20 to the data server in step S102. In other words, the data server may transmit the file names of all data files stored in the indicated folder to the user terminal 20 as identification data in step S103. When the data server sends the file name instead of the identification data in step S103, the user terminal 20 does not need to execute the process of step S104.

It is the same for the first embodiment and the modifications described above that the user terminal 20 displays the pointer in the scroll bar provided in the list window for the data files at a position indicating the number (or the order) of currently-displayed data files among all data files that are stored in the server and can be displayed by the user terminal 20. For example, in the first embodiment, if 200 mails addressed to the user are stored in the server, and the 140th to the 149th mails, i.e., ten mails in total are displayed on the user terminal 20 as a list, the user terminal 20 displays the pointer on the scroll bar of the list window at a position corresponding to the 140th in 200 (a position corresponding to seven-tenths from the top of the scroll bar) in a width corresponding to 10 of 200 (i.e., one-twentieth of the total length of the scroll bar).

On the other hand, if in the modifications, 200 data files are stored in the server in the folder indicated by the user terminal 20, and the user terminal 20 displays the 140th to 149th data files, i.e., ten data files in total, as a list, the pointer is displayed at a position corresponding to 140th in 200 (i.e., seven-tenths from the top of the scroll bar) in the scroll bar of the list window in a width corresponding to 10 in 200 (i.e., one-twentieth of the total length of the scroll bar).

The mail list display program and the mail management program according to the present invention are useful for displaying in a scrollable window of a display unit a list of e-mails stored in a mailbox of a server connected over a network, thus enhancing operability while ensuring security.

According to the present invention, by receiving list information of only those e-mails to be currently displayed in the list window, waiting period required for communication is reduced. As the subject of all the e-mails can be perused successively according to the scroll position in the list window, the operability is enhanced. Further, all the e-mails are managed at the server end, ensuring security.

According to the present invention, in the event of displaying the list window for the first time or over-scrolling, as the list information of other e-mails before and after the ones that are to be displayed in the list window are already available, a list can be quickly created without having to make a fresh request for the list information corresponding to subsequent scroll operations, realizing enhanced operability.

According to the present invention, as the list information of a predetermined number of successive mail IDs in the scroll progression direction obtained ahead of time, a list can be quickly created based on the available list information without having to make a fresh request for the list information corresponding to subsequently scroll operations, realizing enhanced operability.

According to the present invention, mail content information is received and output to a mail content window, separate from the list window.

According to the present invention, by receiving the list information of only those e-mails to be currently displayed in the list window, waiting period required for communication is reduced. As the subject of all the e-mails can be perused successively according to the scroll position in the list window, the operability is enhanced. Further, all the e-mails are managed at the server end, ensuring security.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable non-transitory recording medium that stores therein a mail list display program that causes a computer to display in a scrollable window of a display unit a list of e-mails stored in a mailbox of a server connected over a network, the mail list display program causing the computer to execute:
    firstly receiving from the server, identification data assigned to distinguish one e-mail from another for all the e-mails stored in the mailbox;
    creating the scrollable window with a scroll bar corresponding to total identification data received by the firstly receiving, a position of a scroll pointer in the scroll bar in the scrollable window being determined according to identification data of e-mails to be displayed in the scrollable window, the size of the scroll pointer being determined according to a ratio for a number of identification data of e-mails displayed to a total number of e-mails received by the firstly receiving;
    sending to the server the identification data of the e-mails corresponding to the scroll position of the scrollable window with respect to all the e-mails the identification data of which are received after the firstly receiving, and sending a request for list data used for list display of the e-mails;
    secondly receiving from the server, the list data of the e-mails corresponding to the identification data requested in the sending;
    storing the list data received in the secondly receiving in a predetermined list data storage unit; and
    outputting the list to be currently displayed to the scrollable window created based on the list data stored in the list data storage unit, the position of the scroll pointer and size of the scroll pointer for the scrollable window created,
    wherein the identification data of a predetermined number of e-mails before and after the e-mails along with the identification data of the e-mails to be displayed in the scrollable window are sent to the server in the sending, when the list data of the e-mails to be currently displayed in the scrollable window is not stored in the list data storage unit.

2. The computer-readable non-transitory recording medium according to claim 1, the mail list display program further causing the computer to execute:
    requesting mail content data by sending to the server the identification data of the e-mail for e-mails to which an instruction for perusing a mail content is received among the list in the outputting;
    thirdly receiving the mail content data requested for in requesting from the server; and
    another outputting the mail content data received in receiving to a mail content window provided different from the scrollable window.

3. The computer-readable non-transitory recording medium according to claim 1, wherein the identification data of a predetermined number of successive e-mails in a scroll progression direction is sent to the server in the sending, when a number of the list data not yet displayed in the scrollable window in the scroll progression direction among the list data stored in the list data storage unit becomes less than or equal to a predetermined threshold value.

4. A computer-readable non-transitory recording medium that stores therein a mail list display program that causes a computer to display in a scrollable window of a display unit a list of e-mails stored in a mailbox of a server connected over a network, the mail list display program causing the computer to execute:
    firstly receiving from the server, all identification data assigned to distinguish one e-mail from another for e-mails stored in the mailbox;
    creating the scrollable window with a scroll bar corresponding to total identification data received by the firstly receiving, a position of a scroll pointer in a scroll bar in the scrollable window being determined according to identification data of e-mails to be displayed in the scrollable window as a list the size of the scroll pointer being determined according to a ratio for a number of identification data of e-mails displayed to a total number of e-mails received by the firstly receiving;
    sending to the server the identification data of the e-mails corresponding to the set position of the scroll and sending a request for list data used for list display of the e-mails;
    secondly receiving from the server, the list data of the e-mails corresponding to the identification data requested in the sending;
    storing the list data received in the secondly receiving in a predetermined list data storage unit; and
    outputting a list to be currently displayed to the scrollable window created based on the list data stored in the list data storage unit, the position of the scroll pointer and the size of the scroll pointer for the scrollable window created,
    wherein the identification data of a predetermined number of e-mails before and after the e-mails along with the identification data of the e-mails to be displayed in the scrollable window are sent to the server in the sending, when the list data of the e-mails to be currently displayed in the scrollable window is not stored in the list data storage unit.

5. A computer-readable non-transitory recording medium that stores therein a list display program that causes a computer to display in a scrollable window of a display unit a list of data files stored in a predetermined folder in a server connected over a network, the list display program causing the computer to execute:
    firstly receiving from the server, all identification data assigned to distinguish one data file from another for data files stored in the folder;
    creating the scrollable window with a scroll bar corresponding to total identification data received by the firstly receiving, a position of a scroll pointer in a scroll bar in the scrollable window being determined according to identification data of data files to be displayed in the scrollable window as a list the size of the scroll pointer being determined according to a ratio for a number of identification data of data files displayed to a total number of data files received by the firstly receiving;
    sending to the server the identification data of the data files corresponding to the set position of the scroll pointer, and sending a request for list data used for list display of the data files;
    secondly receiving from the server, the list data of the data files corresponding to the identification data requested in the sending; and creating the list in the scrollable window based on the list data received in the secondly receiving, and outputting the list to the scrollable window, the position of the scroll pointer and the size of the scroll pointer for the scrollable window created, wherein the identification data of a predetermined number of e-mails before and after the e-mails along with the identification data of the e-mails to be displayed in the scrollable window are sent to the server in the sending, when the list data of the e-mails to be currently displayed in the scrollable window is not stored in the list data storage unit.

6. A mail list display apparatus that displays a list of e-mails stored in a mailbox of a server connected over a network, the mail list display apparatus comprising:

a display unit that displays the list of e-mails in a scrollable window;

an identification data receiving unit that receives from the server, all identification data assigned to distinguish one e-mail from another of all the e-mails stored in the mailbox;

a window creating unit that creates the scrollable window with a scroll bar corresponding to total identification data received by the identification data receiving unit, a position of a scroll pointer in the scroll bar in the scrollable window being determined according to identification data of e-mails to be displayed in the scrollable window, the size of the scroll pointer being determined according to a ratio for a number of identification data of e-mails displayed to a total number of e-mails received by the identification data receiving unit;

an identification data sending unit that send to the server the identification data of the e-mails corresponding to the scroll position of the scrollable window with respect to all the e-mails the identification data of which are received after the identification data receiving unit receives all the identification data, and sends a request for list data used for list display of the e-mails;

a list data receiving unit that receives from the server the list data of the e-mails corresponding to the identification data requested by the identification data sending unit;

a list data storing unit that stores the list data received by the list data receiving unit in a predetermined list data storage unit; and a list outputting unit that outputs the list to be currently displayed to the scrollable window created based on the list data stored in the list data storage unit, the list outputting unit outputting the position of the scroll pointer and size of the scroll pointer for the scrollable window created, wherein the identification data of a predetermined number of e-mails before and after the e-mails along with the identification data of the e-mails to be displayed in the scrollable window are sent to the server by the identification data sending unit, when the list data of the e-mails to be currently displayed in the scrollable window is not stored in the list data storing unit.

7. A mail list display method that displays in a scrollable window of a display unit a list of e-mails stored in a mailbox of a server connected over a network, the method comprising:

firstly receiving from the server, identification data assigned to distinguish one e-mail from another for all the e-mails stored in the mailbox;

creating the scrollable window with a scroll bar corresponding to total identification data received by the firstly receiving, a position of a scroll pointer in the scroll bar in the scrollable window being determined according to identification data of e-mails to be displayed in the scrollable window, the size of the scroll pointer being determined according to a ratio for a number of identification data of e-mails displayed to a total number of e-mails received by the firstly receiving;

sending to the server the identification data of the e-mails corresponding to the scroll position of the scrollable window with respect to all the e-mails the identification data of which are received after the firstly receiving, and making sending a request for list data used for list display of the e-mails;

secondly receiving from the server, the list data of the e-mails corresponding to the identification data requested in the sending;

storing the list data received in the secondly receiving in a predetermined list data storage unit; and outputting the list to be currently displayed to the scrollable window created based on the list data stored in the list data storage unit, the position of the scroll pointer and the size of the scroll pointer for the scrollable window created, wherein the identification data of a predetermined number of e-mails before and after the e-mails along with the identification data of the e-mails to be displayed in the scrollable window are sent to the server in the sending, when the list data of the e-mails to be currently displayed in the scrollable window is not stored in the list data storage unit.

* * * * *